US010017237B2

(12) United States Patent
Hutson et al.

(10) Patent No.: US 10,017,237 B2
(45) Date of Patent: Jul. 10, 2018

(54) UNMANNED AERIAL VEHICLE STRUCTURES AND METHODS

(71) Applicant: QUALCOMM Incorporated, San Diego, CA (US)

(72) Inventors: Donald Bolden Hutson, San Diego, CA (US); Clayton Dumstorff, San Diego, CA (US); Jonathan Paul Davis, Philadelphia, PA (US); Paul Stewart Ferrell, San Diego, CA (US); Charles Wheeler Sweet, III, San Diego, CA (US); Travis Van Schoyck, Lafayette Hill, PA (US); Ross Eric Kessler, Philadelphia, PA (US); Aleksandr Kushleyev, Philadelphia, PA (US); Daniel Warren Mellinger, III, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 15/145,176

(22) Filed: May 3, 2016

(65) Prior Publication Data
US 2017/0183074 A1    Jun. 29, 2017

Related U.S. Application Data

(60) Provisional application No. 62/272,530, filed on Dec. 29, 2015.

(51) Int. Cl.
*B64C 1/20*    (2006.01)
*B64C 1/06*    (2006.01)
(Continued)

(52) U.S. Cl.
CPC .............. *B64C 1/061* (2013.01); *B64C 25/52* (2013.01); *B64C 39/02* (2013.01); *B64C 39/024* (2013.01);
(Continued)

(58) Field of Classification Search
CPC ...... B64C 39/024; B64C 39/028; B64D 47/08
See application file for complete search history.

(56) References Cited

U.S. PATENT DOCUMENTS 8,905,351 B2    12/2014   Buscher et al.
9,221,539 B2 *  12/2015   Christensen ........... A63H 17/28
(Continued)

FOREIGN PATENT DOCUMENTS

| CA | 2852326 A1   | 11/2015 |
| CN | 104696674 A  | 6/2015  |
| CN | 204527625 U  | 8/2015  |

OTHER PUBLICATIONS

International Search Report and Written Opinion—PCT/US2016/058246—ISA/EPO—dated Jan. 19, 2017.
(Continued)

*Primary Examiner* — Richard G Davis
(74) *Attorney, Agent, or Firm* — Paradice and Li LLP

(57) ABSTRACT

Embodiments described herein relates to an Unmanned Aerial Vehicle (UAV) having vibration dampening and isolation capabilities, the UAV including a first frame portion, a second frame portion, and a third frame portion. Each of the first frame portion, the second frame portion, and the third frame portion is separated from one another. At least one first support member inelastically coupling the first frame portion and the third frame portion. At least one second support member elastically coupling the second frame portion and one or more of the first frame portion or the third frame portion to isolate the first frame portion and
(Continued)

the third frame portion from vibration of the second frame portion.

26 Claims, 15 Drawing Sheets

(51) Int. Cl.
*B64C 39/02* (2006.01)
*B64D 47/08* (2006.01)
*B64D 27/26* (2006.01)
*B64C 25/52* (2006.01)
*F16F 15/04* (2006.01)

(52) U.S. Cl.
CPC ............ *B64D 27/26* (2013.01); *B64D 47/08* (2013.01); *B64C 2201/027* (2013.01); *B64C 2201/042* (2013.01); *F16F 15/04* (2013.01)

(56) References Cited

U.S. PATENT DOCUMENTS

| | | | |
|---|---|---|---|
| 2009/0008499 A1* | 1/2009 | Shaw | B64C 27/20 244/17.23 |
| 2009/0218447 A1 | 9/2009 | Von Flotow et al. | |
| 2013/0105619 A1* | 5/2013 | Buscher | B64D 47/08 244/17.11 |
| 2014/0145026 A1 | 5/2014 | Skjersaa | |
| 2015/0097950 A1 | 4/2015 | Wang et al. | |
| 2015/0321755 A1* | 11/2015 | Martin | B64C 27/50 244/17.23 |
| 2016/0033077 A1 | 2/2016 | Chen et al. | |
| 2016/0130015 A1* | 5/2016 | Caubel | B64C 27/001 244/120 |
| 2016/0144953 A1* | 5/2016 | Werner | A63H 27/12 244/17.23 |
| 2017/0144751 A1* | 5/2017 | Yu | B64C 27/001 |
| 2017/0264796 A1* | 9/2017 | Tian | B64D 47/08 |

OTHER PUBLICATIONS

Crossfire J., "Camera Mount #6, Rotor Speed, and Flying in Space," RC Groups, Nov. 15, 2006, p. 1.

Garug, "Setting Screenshots and Sample Video: What to do to Improve Stability," BaseCam Electronics, Sep. 2015, p. 1.

Havasuphoto, "550 Pilots Lounge—Other DJI Multi-Rotors," Phantom Pilots, Sep. 30, 2014, p. 1.

SARGUY28, "DJI Flame Wheel F450 and F550 Owners Thread," RC Groups, Sep. 30, 2014, p. 1.

Timnilson, "Official fpvmanuals Pro Tricopter Kit Thread," RC Groups, May 6, 2012, p. 1.

Tissy, "APM Anti-Vibration Floating Plate," Jul. 20, 2013, 9 pages.

* cited by examiner

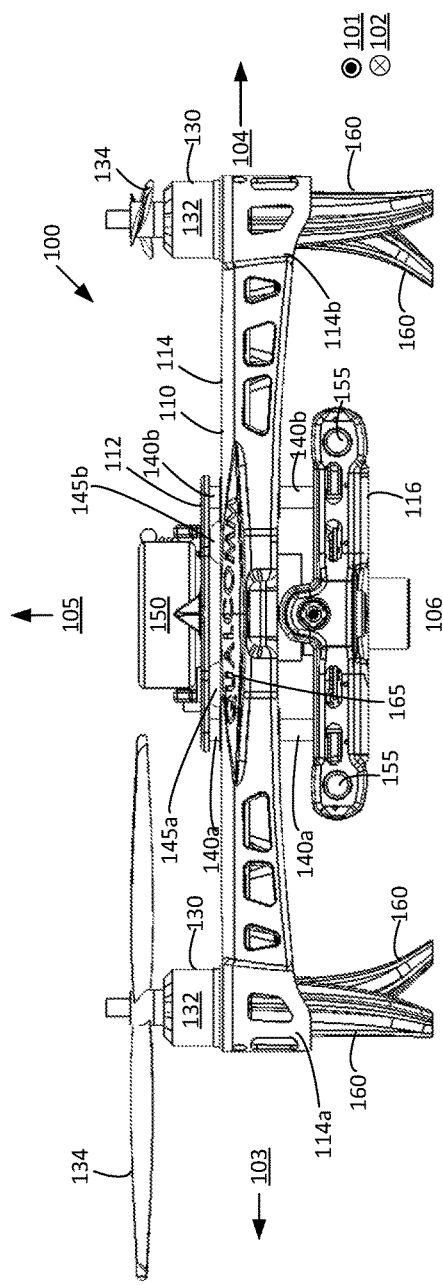
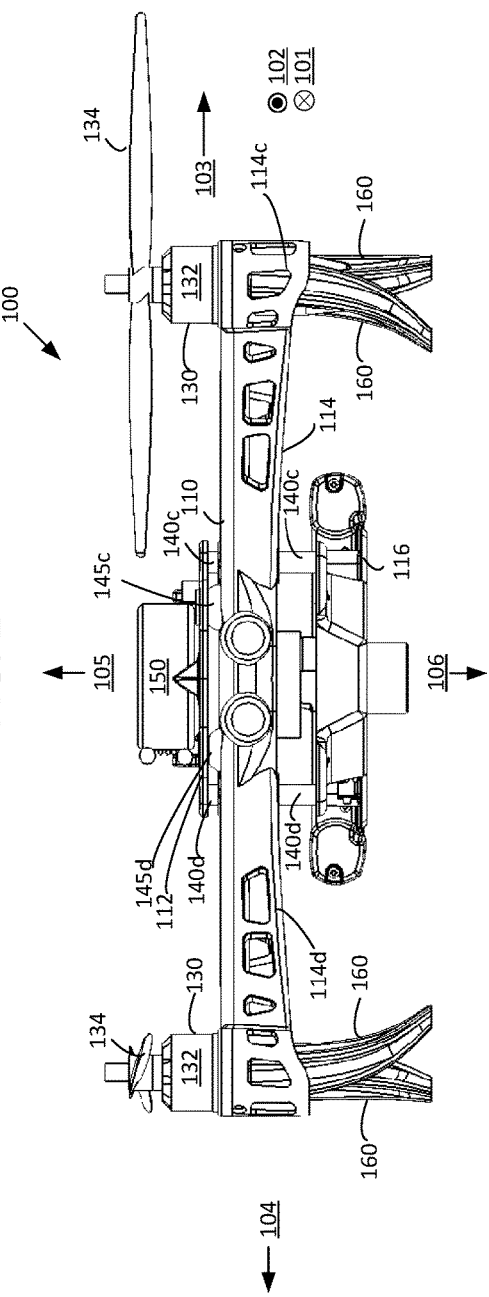

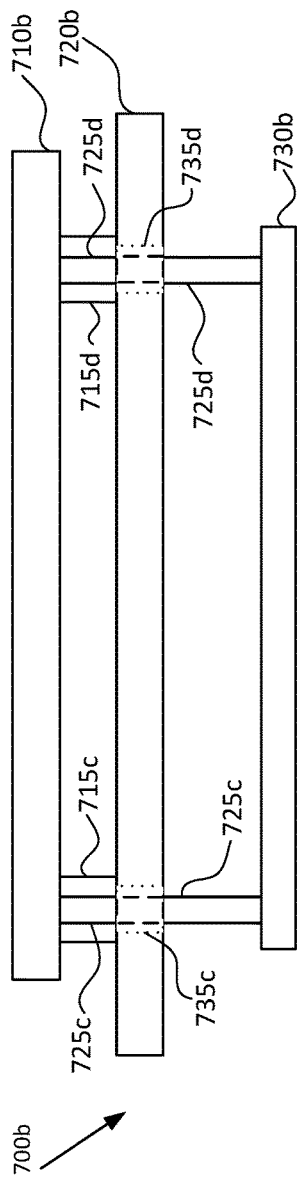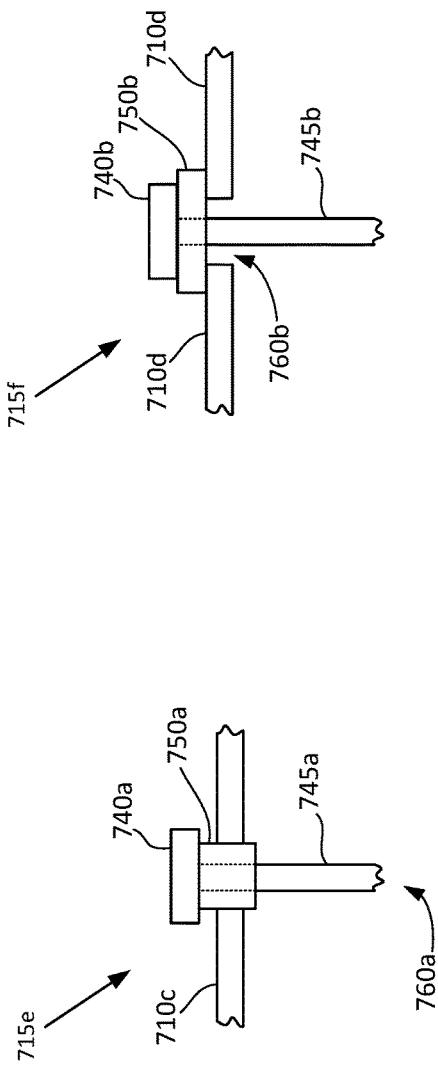

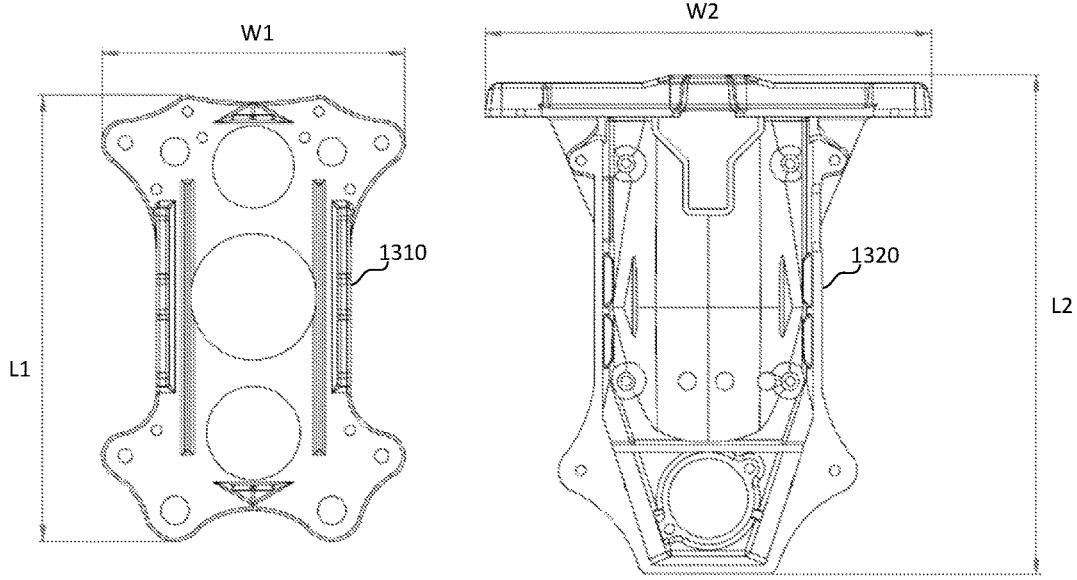
FIG. 13A
FIG. 13B
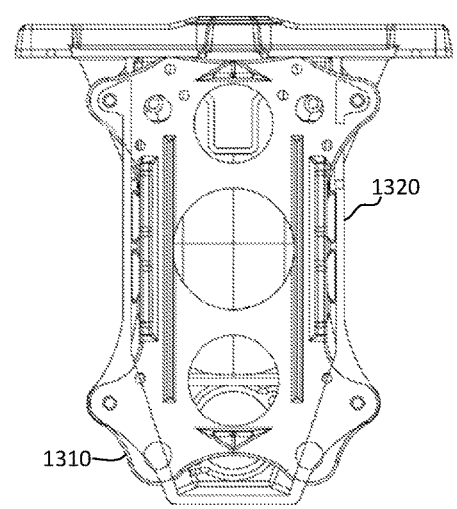
FIG. 13C

UNMANNED AERIAL VEHICLE STRUCTURES AND METHODS

CROSS-REFERENCE TO RELATED PATENT APPLICATIONS

The present disclosure claims priority to, and the benefit of, U.S. provisional patent application Ser. No. 62/272,530, and filed on Dec. 29, 2015, which is incorporated herein by reference in its entirety.

BACKGROUND

A variety of Unmanned Aerial Vehicles (UAVs) have been developed, including Remote Control (RC) planes for the hobbyists, and more advanced "drones" or UAVs for military and commercial applications. A variety of UAV configurations and features, including for example, various "quadcopter" or four-rotor configurations, have been developed for hobby, commercial, or military applications.

During operation, UAVs tend to produce vibrations, momentum and other forces that can create motion and physical displacement of components on the UAV. For example, the aerial propulsion devices, rotor motors, propellers, and the like may be sources of vibration and other forces that can result in movement or physical displacement of UAV components. Given that various sensors and cameras carried by the UAV are motion-sensitive, effective motion dampening, reduction, and/or isolation can reduce or prevent negative impacts on the motion-sensitive elements.

In addition, materials such as, but not limited to plastic (e.g., Acrylonitrile butadiene styrene (ABS), acrylic, nylon, and/or the like), Styrofoam, ceramic, or the like may be employed in the construction or rapid prototyping (e.g., 3-dimensional printing) of UAVs. However, these materials may not provide the desired structural integrity, durability, or rigidity.

SUMMARY

Various embodiments of the present disclosure relate to a structures for Unmanned Aerial Vehicles (UAVs) and methods of making and using such UAVs. Particularly, some embodiments are directed to vibration dampening (mitigation) or isolation for various sensors and/or cameras arranged on the UAV. For example, a frame structure of the UAV may include at least a first frame portion, a second frame portion, and a third frame portion. The second frame portion may be sandwiched or otherwise arranged between the first and the second frame portions in some embodiments. In other embodiments, the first frame portion, the second frame portion, and the third frame portion may be arranged in any other suitable configuration in which the first frame portion, the second frame portion, and the third frame portion may be separated and apart from one another (i.e., not directly contacting one another), with the second frame portion being at least partially motion-isolated or motion-damped from each of the first and third portions. The second frame portion may have at least one vibration source such as, but not limited to, an aerial propulsion device, rotor motor, propeller, and/or the like. The first frame portion and the third frame portion may be rigidly coupled or otherwise secured together, such that the first frame portion and the third frame portion may move together as a single unit or single mass (i.e., the first frame portion and the third frame portion may not move with respect to one another). However, the second frame portion and one or more of the first frame portion or the third frame portion may be elastically or flexibly coupled together for dampening vibration caused by the at least one vibration source arranged on the second frame portion.

In various embodiments, one or more frame structures of a UAV (such as, but not limited to the second frame portion) may be made of a first material (such as, but not limited to plastic (e.g., Acrylonitrile butadiene styrene (ABS), acrylic, nylon, and/or the like), Styrofoam, ceramic, or the like) that may provide advantages in regard to ease of manufacture or assembly, but that may not provide sufficient structural strength or rigidity to support UAV components and maintain structural integrity of the UAV during flight operations. In particular embodiments, the first material may be selected to expeditiously form the one or more frame structures through, for example, 3-dimensional printing. In other embodiments, other suitable materials and processes may be employed for forming the one or more frame structures. The one or more frame structures may include one or more cavities or empty spaces. The cavities or empty spaces may be filled with or occupied by a second material (e.g., carbon fiber, carbon tubes, metal, or the like), where the second material may be more rigid, may have higher temperature tolerance, or may be more durable than the first material. The second material may be inserted into the cavities or empty spaces in the one or more frame structures, after the one or more frame structures of the first material are formed. In other embodiments, the second material may be molded or otherwise formed within the one or more frame structures, for example, during manufacture of the one or more frame structures.

In various embodiments, a UAV may include a stereo camera selected to maximize a Field-of-View (FOV) while not visually capturing any part of the UAV. In particular embodiments, the stereo camera has a 130-degree FOV. Other embodiments may provide other suitable FOVs. The stereo camera may be arranged under or at least partially covered by UAV one or more UAV frame structures or shielding structures, relative to motors/propellers of the UAV, to be shielded from or outside of a downwash (e.g., air currents) generated by the motors/propellers, to mitigate vibrations of the stereo camera. In particular embodiments, a visor or shield may be provided to cover parts of the stereo camera or camera module.

In some embodiments, an Unmanned Aerial Vehicle (UAV) includes a first frame portion, a second frame portion, a third frame portion, each of the first frame portion, the second frame portion, and the third frame portion is separated from one another, at least one first support member inelastically coupling the first frame portion and the third frame portion, and at least one second support member elastically coupling the second frame portion and one or more of the first frame portion or the third frame portion to isolate the first frame portion and the third frame portion from vibration of the second frame portion.

In various embodiments, the second frame portion is arranged between the first frame portion and the third frame portion.

In some embodiments, the UAV further includes at least one aerial propulsion device arranged on the second frame portion.

In various embodiments, the at least one aerial propulsion device generates vibration that is propagated through the second frame portion. The at least one second support member is configured to isolate the one or more of the first frame portion or the third frame portion from the vibration generated by the at least one aerial propulsion device.

In some embodiments, the UAV further includes a battery arranged on the first frame portion.

In some embodiments, the UAV further includes at least one of a camera, sensor, RF resource, processor, or memory arranged on the third frame portion.

In some embodiments, the first frame portion is coupled to the third frame portion via only the at least one first support member.

In some embodiments, the second frame portion is coupled to the one or more of the first frame portion or the third frame portion via only the at least one second support member.

In some embodiments, the first frame portion and the third frame portion are configured to move as a single mass relative to the second frame portion.

In some embodiments, the at least one first support member includes one or more of a rod, beam, shaft, shackle, clamp, or bolt.

In some embodiments, the at least one second support member includes one or more of a rubber bushing, rubber grommet, shock absorbers, or spring.

In some embodiments, the at least one second support member is arranged to be under compression from a combined mass of the first frame portion and the third frame portion.

In some embodiments, the second frame portion defines at least one hole. The at least one first support member is arranged to extend from the first frame portion and through the at least one hole to couple to the third frame portion.

In some embodiments, the at least one first support member is arranged to be separate from the second frame portion such that vibrations of the second frame portion are isolated from the at least one first support member.

In some embodiments, the first frame portion is a tray configured to carry a battery for powering the UAV.

In some embodiments, at least one of the first frame portion, the second frame portion, or the third frame portion is composed of a first material corresponding to a main frame structure and a second material corresponding to a sub-frame structure. The second material is more rigid than the first material.

In some embodiments, the main frame structure has at least one passage. The sub-frame structure is arranged in the at least one passage.

In some embodiments, the first material is at least one of plastic, Styrofoam, or ceramic.

In some embodiments, the second material is at least one of carbon fiber, steel, or metal.

In some embodiments, a method for providing a UAV includes providing a first frame portion, providing a second frame portion, providing a third frame portion, wherein each of the first frame portion, the second frame portion, and the third frame portion is separated from one another, providing at least one first support member to inelastically couple the first frame portion and the third frame portion, and providing at least one second support member to elastically couple the second frame portion and one or more of the first frame portion or the third frame portion to isolate the first frame portion and the third frame portion from vibration of the second frame portion.

In some embodiments, a UAV includes a first frame portion, a second frame portion, a third frame portion, each of the first frame portion, the second frame portion, and the third frame portion is separated from one another, at least a battery arranged on the first frame portion, at least one of a camera, sensor, RF resource, processor, or memory arranged on the third frame portion, wherein the first frame portion, the third frame portion, the battery, and the at least one of the camera, sensor, RF resource, processor, or memory are inelastically secured together to move as a single mass, and the single mass is isolated from vibration of the second frame portion.

In some embodiments, the UAV further includes at least one aerial propulsion device, wherein the vibration of the second frame portion is generated by the at least one aerial propulsion device.

In some embodiments, the first frame portion, the third frame portion, the battery, and the at least one of the camera, sensor, RF resource, processor, or memory are inelastically secured together by inelastically coupling the first frame portion and the second frame portion with at least one first support member.

In some embodiments, the single mass is isolated from the vibration of the second frame portion by elastically coupling the second frame portion and one or more of the first frame portion or the third frame portion with at least one second support member.

In some embodiments, a method for providing a UAV includes providing a first frame portion, providing a second frame portion, providing a third frame portion; wherein each of the first frame portion, the second frame portion, and the third frame portion is separated from one another, arranging at least a battery on the first frame portion, arranging at least one of a camera, sensor, RF resource, processor, or memory on the third frame portion, inelastically securing the first frame portion, the third frame portion, the battery, and the at least one of a camera, sensor, RF resource, processor, or memory together to form a single mass, and isolating the single mass from vibration of the second frame portion.

In some embodiments, inelastically securing the first frame portion, the third frame portion, the battery, and the at least one of a camera, sensor, RF resource, processor, or memory together to form the single mass includes inelastically coupling the first frame portion and the second frame portion with at least one first support member.

In some embodiments, isolating the single mass from vibration of the second frame portion includes elastically coupling the second frame portion and one or more of the first frame portion or the third frame portion with at least one second support member.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

FIG. 2 shows a front view of a UAV according to some embodiments.

FIG. 3 shows a rear view of a UAV according to some embodiments.

FIG. 7B shows a schematic diagram of a vibration isolation structure suitable for implementing for a UAV according to some embodiments.

FIG. 7C shows a schematic diagram of a second support member suitable for implementing for a UAV according to some embodiments.

FIG. 7D shows a schematic diagram of a second support member suitable for implementing for a UAV according to some embodiments.

FIG. 13A shows a top view of a frame portion according to some embodiments.

FIG. 13B shows a top view of a frame portion according to some embodiments.

FIG. 13C shows a top view of the frame portion as assembled for a UAV.

DETAILED DESCRIPTION

Figure 1:
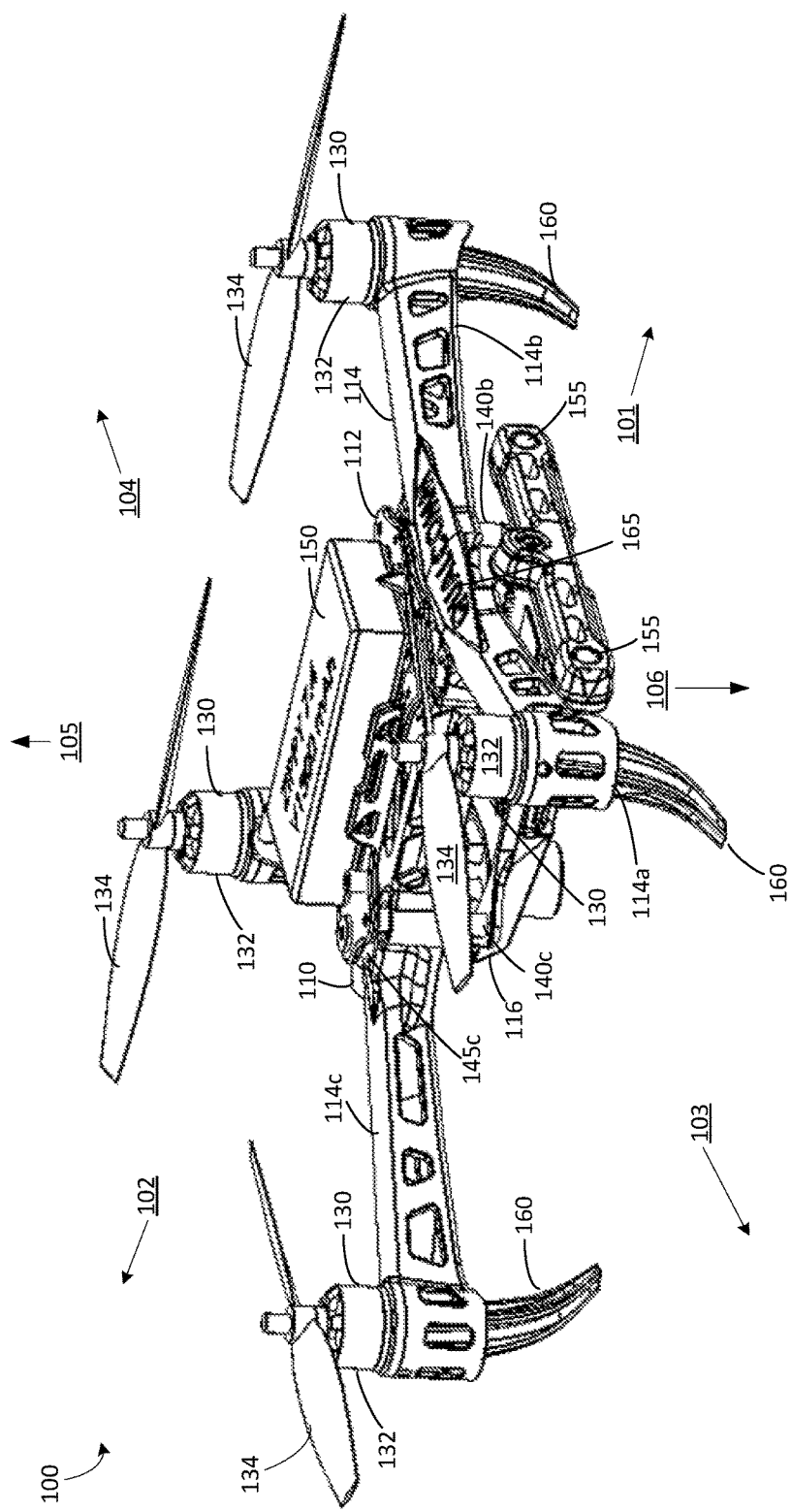
FIG. 1 shows a perspective view of an Unmanned Aerial Vehicle (UAV) according to some embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Embodiments described herein can provide various benefits over conventional Unmanned Aerial Vehicles (UAVs). Some embodiments described herein can effectively dampen or otherwise reduce the transfer of vibrations to certain motion-sensitive elements (e.g., sensors and/or cameras, control electronics, cargo holders, etc.) carried by the UAV. In particular embodiments, the UAV may include at least a first frame portion, a second frame portion, and a third frame portion. The second frame portion may be arranged between (for example, sandwiched by) the first frame portion and the third frame portion, but elastically coupled to at least one of the first and third frame portions through an elastic, vibration-dampening connection. The vibration-dampening connection couples the second frame portion to at least one of the first frame portion and the second frame portion for support, but also dampens or inhibits communication of vibrations from second frame portion to the first and third frame portions. In particular embodiments, the vibration-dampening connection includes a compressible or elastic support member such as, but not limited to, one or more of a rubber bushing, rubber grommet, shock absorber, spring, or the like. In further embodiments, the elastic or compressible support member may be constantly under partial compression to reduce degradation (e.g., tear) to the elastic or compressible support member.

The first frame portion may be arranged on one side of the second frame portion (e.g., either over the top or under the bottom of the second frame portion, when the UAV is in an upright, operating position). The third frame portion may be arranged on the opposite side of the second frame portion, relative to the first frame portion. In particular embodiments, the first frame portion may provide platforms for supporting various components of the UAV, including vibration sensitive components, while the second frame portion may provide a platform for supporting components that tend to generate vibrations during operation, such as, but not limited to one or more rotor motors, propellers, air currents from the propellers, or other propulsion source or sources and the like. Because at least one or both of the first frame portion or the third frame portion may be elastically coupled to the second frame portion through the vibration-dampening connection, the communication of vibrations from the vibration-generating components on the second frame portion to the first frame portion or the third frame portion are dampened.

In particular embodiments, the first frame portion and the third frame portion may be inelastically or rigidly secured together, where the combined mass of the rigidly connected first and third frame portions may help reduce communication of vibrations (from the second frame portion) to components mounted and supported on the first or third frame portions. That is, the combined mass of the rigidly connected first and third frame portions may dampen vibrations communicated from the second frame portion to the combined mass, to a greater extent than would a smaller mass of only one of the first frame portion or the third frame portions. Accordingly, vibration sensitive UAV components supported on the first frame portion and/or the third frame portion may benefit from a greater vibration dampening effect of the combined mass of the first frame portion, the third frame portion, and the components supported on those frame portions.

Illustrating with a non-limiting example, the first frame portion may include or support a power source, such as, but not limited to a battery or capacitor, for powering the UAV. In particular embodiments, the first frame portion may include or form a tray to which the battery, capacitor or other power source may be coupled and supported. One or more vibration sensitive devices, such as, but not limited to stereo cameras (e.g., a stereo camera pair), sonars, antennas, flight controllers, and other sensors may be arranged on the third frame portion. At least one first support member (such as, but not limited to, a rod, beam, shaft, shackle, clamp, bolt, or the like) may inelastically or rigidly secure or otherwise couple the first frame portion and the third frame portion together, such that the first frame portion and the third frame portion (as well as the one or more battery, stereo cameras, sonars, antennas, flight controllers, and the like arranged on the first frame portion and the third frame portion) may form a unitary mass.

In addition, the frame structure of the UAV (including one or more of the first frame portion, the second frame portion, and the third frame portion) may include a main frame structure composed of a first material and a sub-frame structure composed of a second material. In particular embodiments, the first material allows for rapid prototyping or production of the main frame structure, while the second material or configuration (or both) of the sub-frame structure increases the structural integrity, stiffness, or rigidity (or any combination thereof) of the frame portion. For example, the first material may be a material that is relatively low mass (low weight) or that can be formed into a desired shape with relative ease (or both), such as, but not limited to plastic, Styrofoam, ceramic, or the like. The second material may be a material that has a relatively high structural strength, stiffness, or rigidity, such as, but not limited to carbon fiber, steel, other metal, or the like.

In particular embodiments, the main frame structure includes one or more cavities or spaces in which the sub-frame structure is located. The sub-frame structure can be formed in a shaft or rod-shape for ease of manufacture, but can increase strength, rigidity and stiffness of a more complex-shaped, light-weight main frame structure. Therefore, through the use of a combination of a main frame structure and a sub-frame structure for one or more of the first frame portion, the second frame portion or the third frame portion, main frame structures may be formed of a material that is readily applicable to manufacturing techniques that more easily or economically form relatively complex shapes and configurations (such as, but not limited to 3D modeling, rapid prototyping, molding, or the like), while sub-frame structures may be formed of a material that adds structural strength, rigidity or stiffness to the main frame.

In some embodiments, the frame structure of the UAV may allow camera modules (having cameras such as, but not limited to, stereo cameras) to be provided on a frame portion (at least one of the first frame portion or the third frame portion) that is vibration-isolated or dampened from the motion sources of the UAV. In addition, the camera modules may also be arranged such that the camera modules and the cameras are shielded from or are outside of (or both) the paths of air currents (or downwash) generated by the propellers, and the like. In certain embodiments, a visor or other types of shields may be positioned between the propellers and the camera modules to block at least some of the air currents generated by the propellers of the aerial propulsion devices. In other embodiments, the camera modules are positioned to be sufficiently shielded by frame structure or other existing structures of the UAV or outside of direct air paths from the propellers, such that the visor or other shield may be omitted.

Figure 4:
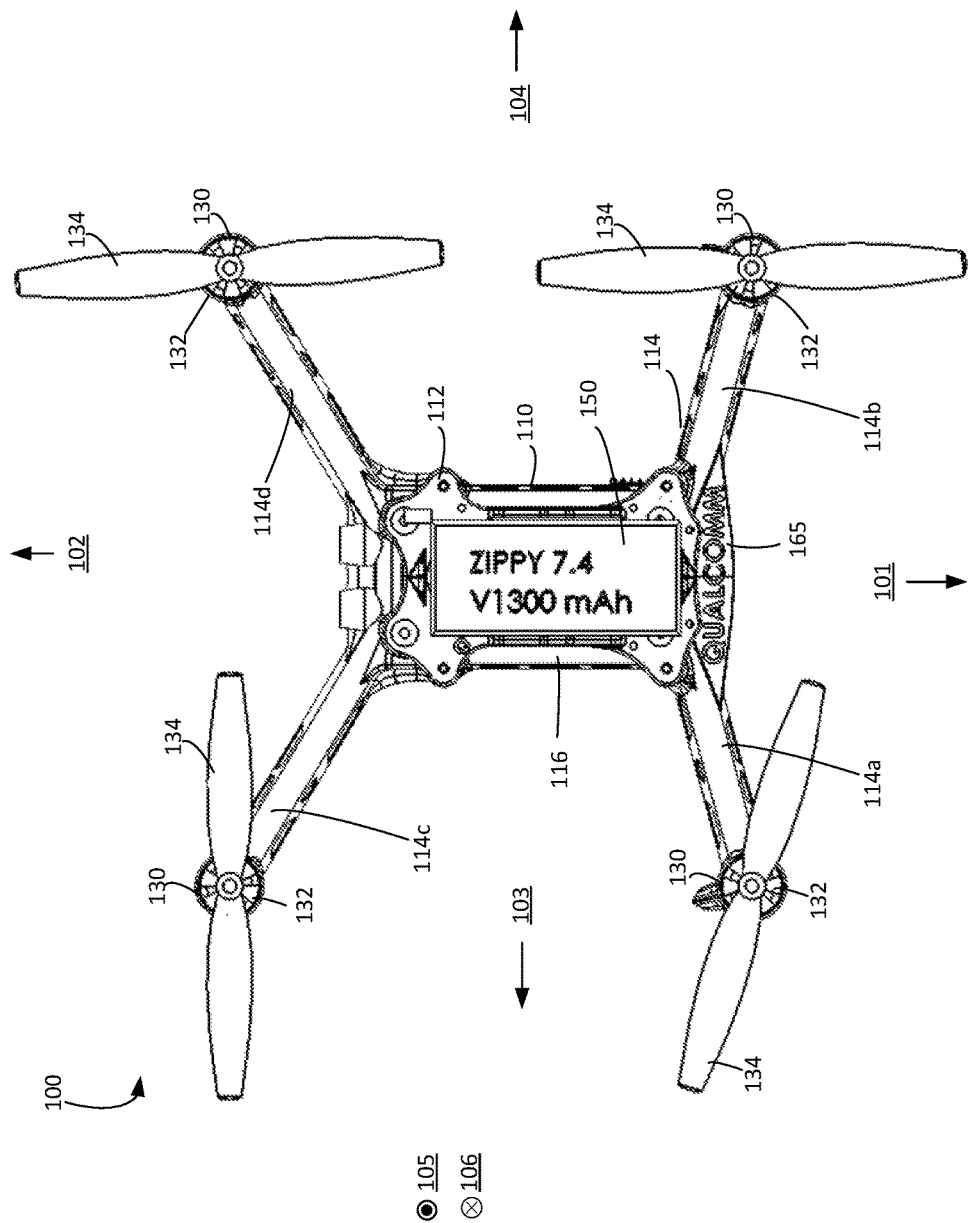
FIG. 4 shows a top view of a UAV according to some embodiments.
Figure 5:
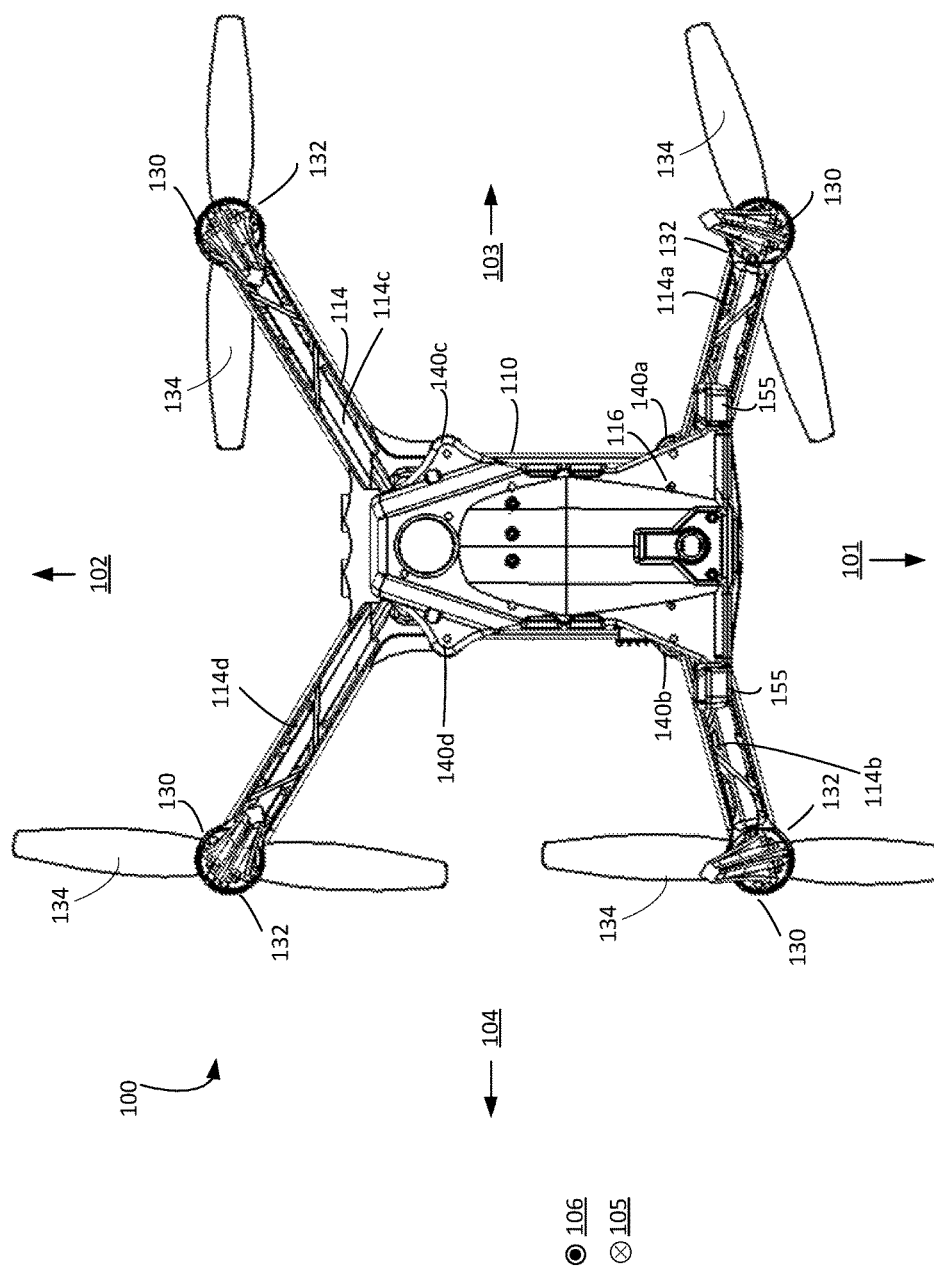
FIG. 5 shows a bottom view of a UAV according to some embodiments.
Figure 6:
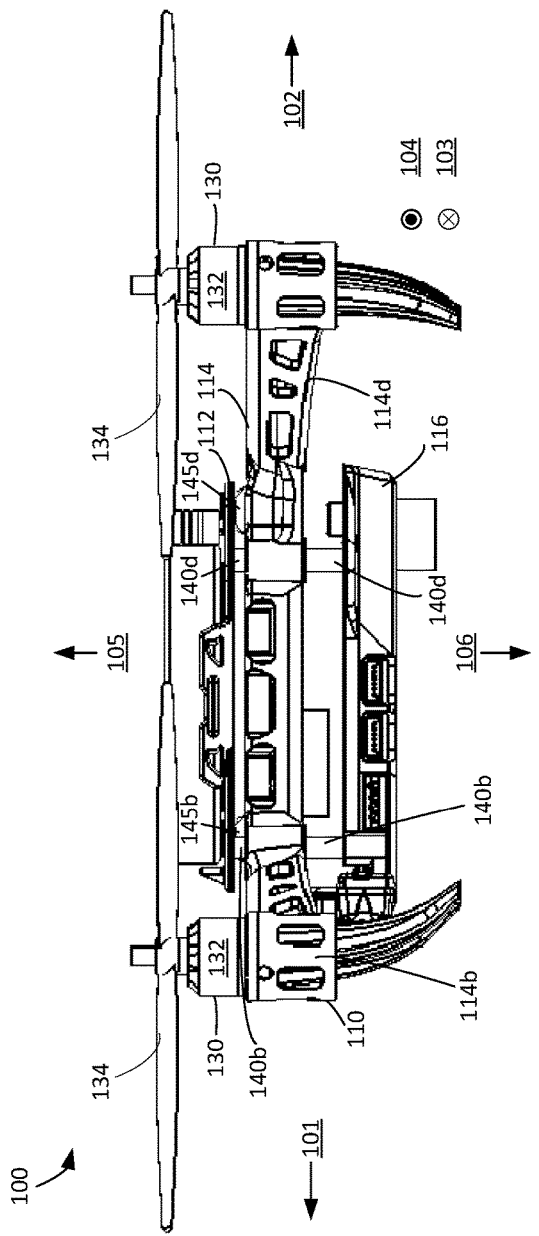
FIG. 6 shows a side view of a UAV according to some embodiments.

FIG. 1 shows a perspective view of a UAV 100 having a frame structure according to various embodiments. FIG. 2 shows a front view of the UAV 100 according to some embodiments. FIG. 3 shows a rear view of the UAV 100 according to some embodiments. FIG. 4 shows a top view of the UAV 100 according to some embodiments. FIG. 5 shows a bottom view of the UAV 100 according to some embodiments. FIG. 6 shows a side view of the UAV 100 according to some embodiments. Referring to FIGS. 1-6, the UAV 100 is shown with respect to various reference directions. A front direction 101, a rear direction 102, a left direction 103, a right direction 104, a top direction 105, and a bottom direction 106 are shown with respect to the UAV 100.

The UAV 100 may have a frame or frame structure 110. The frame structure 110 may include at least a first frame portion 112, a second frame portion 114, and a third frame portion 116. The frame structure 110, including one or more (or each) of the first frame portion 112, the second frame portion 114, and the third frame portion 116, may be a structure (or combination of structures) on which other components of the UAV 100 may be mounted and supported.

The UAV 100 may have one or more aerial propulsion devices 130. Each of the aerial propulsion devices 130 shown in the drawings includes a rotor propeller assembly. In some non-limiting examples, the UAV 100 may have four aerial propulsion devices 130. In other embodiments, the UAV 100 may have fewer than four aerial propulsion devices 130 or more than four aerial propulsion devices 130. While certain embodiments may employ aerial propulsion systems having a rotor propeller assembly, other embodiments may employ other suitable types of aerial propulsion systems such as, but not limited to a jet propulsion system.

The UAV 100 may have one or more rotor motors 132, included as a part of each of the aerial propulsion devices 130. Each rotor motor 132 may be coupled to drive an associated propeller 134 (propeller blade(s)), to provide aerial propulsion for the UAV 100. The speed of revolution of the rotor motors 132 (corresponding to air propulsion motors 914 in FIG. 9) may be controlled by a central processor (e.g., a processor 902 in FIG. 9) provided as part of the UAV 100 (e.g., a UAV 800 in FIG. 8). The central processor may use differences in rotational speeds of the various rotor motors 132 to control the in-flight motion of the UAV 100. Techniques similar to those used with quadcopters or the like may be used with the rotor motors 132 in order to control the UAV 100 for lift off, flight and landing, as well as in-flight maneuvering.

The frame structure 110 may form one or more arms that extend from a center section of the frame structure 110, for supporting one or more aerial propulsion devices 130. In particular embodiments, the arms of the frame structure 110 are arm sections 114a-114d of the second frame portion 114. In some embodiments, one of the rotor motors 132 may be provided on each arm section 114a, 114b, 114c, or 114d. In other embodiments, more than one rotor motor 132 may be provided on each arm section 114a, 114b, 114c, or 114d. In yet other embodiments, rotor motors 132 may be omitted from one or more arm sections 114a-114d. Each of the rotor motors 132 may include (or is connected through) an interface with its associated propeller 134. Each of the rotor motors 132 may be coupled to an arm section 114a, 114b, 114c, or 114d and arranged such that the propeller 134 (and the interface of the rotor motors 132) is pointed (at least substantially) toward the top direction 105. Other arrangements or configurations of the rotor motors 132 (and/or the propellers 134) different than that shown, may be used in other embodiments.

The rotor motors 132 and the propellers 134 (collectively, the aerial propulsion devices 130) may be motion sources that, during operation, generate vibrations or other motions that can propagate through portions of the frame structure 110. In embodiments in which the aerial propulsion devices 130 are arranged on and supported by the arm sections 114a-114d (or other portions) of the second frame portion 114, such vibrations or other motions may be propagated through the second frame portion 114. The second frame portion 114 may additionally carry components that may be motion-insensitive, such as, but not limited to, wires, electronic boards, motion-insensitive sensors, and the like.

In some embodiments, as shown in the drawings, each propeller 134 includes a total of three blades. In other embodiments, other propeller configurations may be used including configurations with more or fewer than three blades. In some embodiments, each aerial propulsion device 130 may also include a propeller guard (not shown), for example, coupled to the arm sections 114a-114d (or other portions) of the second frame portion 114. The propeller guards may be a substantially rigid structure that prevents the propeller 134 of the aerial propulsion devices 130 from striking objects to one or more sides of the UAV 100.

Each of the first frame portion 112, the second frame portion 114, and the third frame portion 116 may be separate or distinct components of the UAV 100 secured together by at least one first support member (e.g., first support members 140a-140d) and at least one second support member (e.g., second support members 145a-145d), for example, in the manner described. In illustrated embodiments, four first support members 140a-140d and four second support members 145a-145d are shown. Other embodiments may include more or fewer than four first support members or more or fewer than four second support members. In particular embodiments, the second frame portion 114 is not linked to or in contact with the first frame portion 112 or the third frame portion 116, other than through the second support members 145a-145d. Accordingly, in such embodiments, the second support members 145a-145d provide the only structural connection of the second frame portion 114 to the first frame portion 112 or the third frame portion 116. Thus, paths through which vibration or other motion from the second frame portion 114 can be propagated in the frame structure 110 are limited to the second support members 145a-145d.

Illustrating with the non-limiting examples of FIGS. 1-6, the first frame portion 112 may be arranged in the top direction 105 with respect to the second frame portion 114. The third frame portion 116 may be arranged in the bottom direction 106 with respect to the second frame portion 114. In other words, the first frame portion 112 and the third frame portion 116 may be at either side of the second frame portion 114. Thus, the second frame portion 114 may be between the first frame portion 112 and the third frame portion 116 in a sandwich-like configuration. In other embodiments (not shown), the first frame portion 112, the second frame portion 114, and the third frame portion 116 may be in any other suitable configurations in which the first frame portion 112, the second frame portion 114, and the third frame portion 116 may be separated or out of direct contact with one another, except via the first support member (e.g., the first support members 140a-140d) and the second support member (e.g., the second support members 145a-145d).

Various components of the UAV 100 may be arranged on, coupled to or fixed to the first frame portion 112, including, but not limited to a battery or other power source. Illustrating with a non-limiting example, a battery 150 may be secured to the first frame portion 112. The first frame portion 112 may include or be configured to form a battery tray or layer to support the battery 150. The battery 150, which can be a relatively heavy component of the UAV 100, may be positioned on the first frame portion 112 such that the weight of the battery 150 may be distributed more evenly across the first frame portion 112 (for example, to avoid tilting the UAV 100 to one side). In further embodiments, other components of the UAV 100 such as, but not limited to, cameras, sonars, sensors, RF resources, processors, memory, flight controllers, and the like may likewise be arranged on, coupled to or fixed to the first frame portion 112. In particular embodiments, the first frame portion 112 and any components fixed thereto may be arranged out of contact with the second frame portion 114 and any components fixed thereto, other than via the second support members 145a-145d in the manner described.

Various components of the UAV 100 may be arranged on or fixed to the third frame portion 116. In particular embodiments, the third frame portion 116 may be an electronics layer for structurally supporting various electronics. In particular embodiments, the third frame portion 116 and any components fixed thereto may be arranged out of contact with the second frame portion 114 and any components fixed thereto, other than via the second support member in the manner described.

Illustrating with a non-limiting example, a camera 155 (e.g., a stereo camera) may be arranged on, attached to or fixed to the third frame portion 116. Other components of the UAV 100 such as, but not limited to, batteries, cameras, sonars, sensors, RF resources or other communication electronics, processors, memory, flight controllers, and/or the like may likewise (or in the alternative) be arranged on, attached to or fixed to the third frame portion 116. In some embodiments, a power source for the UAV 110 (e.g., the battery 150) may be provided on the first frame portion 112 only. In other embodiments, the power source (e.g., the battery 150) may be provided on the third frame portion 116 only, or multiple power sources (e.g., batteries 150) may be provided on both the first frame portion 112 and the third frame portion 116. For example, a first power source may be provided on one of the first and third frame portions 112 and 116, for providing power to the aerial propulsion devices 130 (e.g., the rotor motors 132), while a second power source may be provided on the same or other one of the first and third frame portions 112 and 116, for providing power to electronics (such as, but not limited to the cameras, sonars, sensors, RF resources or other communication electronics, processors, memory, flight controllers, and the like).

At least one first support member (e.g., the first support members 140a-140d) may couple the first frame portion 112 and the third frame portion 116. The first support member 140a-140d may be one or more of a rod, beam, shaft, shackle, clamp, bolt, and the like. The first support member may inelastically or rigidly couple the first frame portion 112 and the third frame portion 116 without contacting the second frame portion 114. Illustrating with the non-limiting example of FIGS. 1-6, each of the first support members 140a-140d may be a bolt fixed to the first frame portion 112 on (or approximate) one end and fixed to the third frame portion 116 on (or approximate) the opposite end. The first support members 140a-140d may enable the first frame portion 112 and the third frame portion 116 to effectively form and behave as a single, rigid mass or unit.

Each of the first support members 140a-140d may be arranged to not contact the second frame portion 114. For example, the second frame portion 114 may have passages or holes (e.g., 735a-735d in FIGS. 7A-7B) for each of the first support members 140a-140d to pass through, without contacting any part of the second frame portion 114. The passages or holes may each have a cross-section sufficiently larger than a cross section of the first support members 140d-140d, such that the first support members 140a-140d may remain out of contact with the second frame portion 114 (including the inner walls of the passages or holes in the second frame portion 114). Thus, in particular embodiments, each of the first frame portion 112, the third frame portion 116, and the at least one first support member 140a-140d remains out of direct contact with any part of the second frame portion 114. As such, any vibration from the second frame portion 114 is prevented (or at least partially prevented) from affecting the first support members 140a-140d, and thus the first frame portion 112 and the second frame portion 114.

At least one second support member (e.g., the second support members 145a-145d) may elastically or flexibly connect the first frame portion 112 and the second frame portion 114 to dampen or isolate vibrations originating from motion sources fixed on the second frame portion 114. Each of the at least one second support member may be an elastic bushing (e.g., a rubber bushing), elastic grommet (e.g., a rubber grommet), shock absorbers, spring, or the like. In some embodiments, one end (or a portion) of each of the second support members 145a-145d may be fixed to the first frame portion 112 while an opposite end (or a portion) of each of the second support members 145a-145d may be fixed to the second frame portion 114. In some embodiments one end (or a portion) of each of the second support members 145a-145d may be fixed to one of the first frame portion 112 or second frame portion 115 while an opposite end (or a portion) of each of the second support members 145a-145d may be pressed against another one of the first frame portion 112 or second frame portion 115.

In some embodiments, each of the second support members 145a-145d may be under compression between the first frame portion 112 and the second frame portion 114. For example, the combined weight of the first frame portion 112 and the third frame portion 116 may cause the second support members 145a-145d to be compressed given that the second support members 145a-145d may be positioned between the first frame portion 112 and the second frame portion 114. In other embodiments, support members (such as, but not limited to, the second support members 145a-145d) may be extended or stretched (instead of being compressed) due to the weight of the first frame portion 112 and/or the third frame portion 116 for configurations in which the first frame portion 112 and/or the third frame portion 116 may be suspended from the second frame portion 112 via the support members. As compared to the support members being extended, the support members being compressed may reduce degradation of the second support members 145a-145d caused by extension over time, thus reducing a risk of the first frame portion 112 and the third frame portion 116 (as well as any components provided thereon) being dropped or disoriented. The improved structural integrity associated with the second support members 145a-145d being under compression instead of extension may be more pronounced in situations in which the payload is heavy.

In some embodiments (not shown), the at least one support member (such as, but not limited to, the second support members 145a-145d) may elastically connect the second frame portion 114 and the third frame portion 116 (instead of the first frame portion 112). In some embodiments (not shown), at least one second support member may elastically connect the second frame portion 114 and the third frame portion 116 while at least one other second support member may elastically connect the first frame portion 112 and the second frame portion 114 in a similar manner. That is, one or more second support members may be provided between the first frame portion 112 and the second frame portion 114, and one or more second support members may be provided between the second frame portion 114 and the third frame portion 116.

The UAV 100 may include at least one landing leg (e.g., landing legs 160) for supporting the UAV 100 as it lands or takes off from ground. In the illustrated embodiments, four landing legs 160 are shown. Other embodiments may include more or fewer than four landing legs 160.

In some embodiments, the landing legs 160 may be a part of the frame structure 110. Particularly, the landing legs 160 may be a part of or attached to the second frame portion 114 (for example, but not limited to, each arm section 114a, 114b, 114c, or 114d of the second frame portion 114). For example, each arm section 114a, 114b, 114c, or 114d of the second frame portion 114 may include a receptacle or other attachment location, to which a landing leg 160 is attached, as shown in FIGS. 1-6. In certain embodiments, the landing legs 160 may be attached to the receptacles on the arm sections 114a-114d with screws, bolts or other attachment mechanisms that allows the landing legs 160 to be selectively removed and replaced, for example, if worn or broken. In other embodiments, the landing legs 160 may be a part of or attached to other frame portions of the frame structure 110 such as, but not limited to, the first frame portion 112 or the third frame portion 116, for example, in a similar manner. The landing legs 160 may have a first end fixed to the frame structure 110 (the second frame portion 114 of the frame structure 110, in the embodiment of FIGS. 1-6). An opposite second end may be tapered as compared to the first end.

The second end of each landing leg 160 may include a bend or be angled (or both) toward a center of the UAV 100, for example, to reduce abrasion to the landing leg 160 during landing (for example, in the event that the UAV 100 scoots or shifts laterally during landing or take-off). In particular embodiments, each landing leg 160 is bent or angled (or both) in a direction that corresponds to the angle direction of the arm section 114a, 114b, 114c, or 114d of the second frame portion 114 to which the landing leg is attached, such that the bent or angled portion of the landing leg 160 extends directly under the arm section 114a, 114b, 114c, or 114d in the bottom 106 direction. As a result, the landing leg 160 can be arranged outside of (or substantially outside of) the air flow (or downwash) of the propeller 134 above the landing leg 160, to obviate or minimize any additional impact that the landing leg 160 may have on the in-flight operation of the UAV 100.

The camera 155 may be a stereo camera capable of providing depth perception views in some embodiments. In other embodiments, the camera 155 may be any suitable types of camera such as, but not limited to, an infrared camera, digital camera, gimbal camera, Internet Protocol (IP) camera, or the like. The camera 155 may have a Field-of-View (FOV) such as, but not limited to 100 degrees, 110 degrees, 115 degrees, 120 degrees, 125 degrees, 130 degrees, 135 degrees, 140 degrees, 150 degrees, or the like. In particularly embodiments, the FOV of the camera 115 may be 130 degrees or any other suitable angle to maximum the FOV while not capturing any part of the UAV 110 (e.g., the first frame portion 112, the second frame portion 114, or the third frame portion 116) within the field of view.

The camera 155 (a camera module 1030 in FIG. 10A and a camera module 1035 in FIG. 10B) may be arranged to be outside of or clear of direct paths of air currents or downwash (downwash areas 1020a-1020d in FIGS. 10A and 10B) generated by the aerial propulsion devices 130 (e.g., the propellers 134). In particular embodiments, the camera 155 may be supported on the third frame portion 116 (a third frame portion 1040 in FIGS. 10A and 10B), at a location that is under (in the bottom direction 106) the second frame portion 114 (such as under one or more of the arm sections 114a-114d of the second frame portion 114), so as to be out of a direct path of the of air currents or downwash generated by the aerial propulsion devices 130. In such embodiments, the camera 155 may be shielded (or at least partially shielded) from direct air currents or downwash from the propeller devices by the second frame portion 114. Accordingly, the stability of the camera 155 may be unaffected (or less affected) by air currents or downwash from the propeller devices. In certain embodiments, at least one visor 165 (a visor 1050 in FIG. 10B) or shield may be arranged at least partially between the camera 155 and the aerial propulsion devices 130 (e.g., the propellers 134) to block at least some of the air currents or downwash generated by the aerial propulsion devices 130. In other embodiments in which the camera 155 is arranged sufficiently below a frame portion of the frame structure 110 to be outside of direct paths of air currents or downwash generated by the aerial propulsion devices 130, the visor 165 or additional shield may be omitted.

Figure 7A:
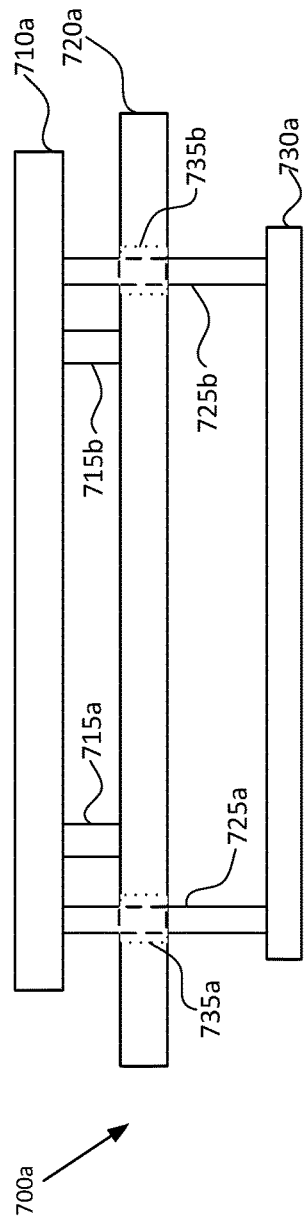
FIG. 7A shows a schematic diagram of a vibration isolation structure suitable for implementing for a UAV according to some embodiments.

FIG. 7A shows a schematic diagram of a vibration isolation structure 700a suitable for implementing in a UAV, such as the UAV 100 (FIGS. 1-6) according to some embodiments. Referring to FIGS. 1-7A, a first frame portion 710a may correspond to the first frame portion 112. A second frame portion 720a may correspond to the second frame portion 114. A third frame portion 730a may correspond to the third frame portion 116. The first frame portion 710a may be elastically coupled to the second frame portion 720a via second support members 715a and 715b, each of which may correspond to one or more of the second support members 145a-145d. The second support members 715a and 715b may couple the first frame portion 710a and the second frame portion 720a while reducing or cancelling vibration or other motions originating from the second frame portion 720a.

The first frame portion 710a may be inelastically coupled to the third frame portion 730a via first support members 725a and 725b, each of which may correspond to one or more of the first support members 140a-140d. Each of the first frame portion 710a, the third frame portion 730a, and the first support member 725a and 725b may be arranged out of direct contact with any part of the second frame portion 720a. The second frame portion 720a may include passages or holes 735a and 735b for the first support members 725a and 725b, respectively, to pass through. Each of the holes 735a and 735b may be large enough such that, during any movement of the first support members 725a and 725b in normal operation of the UAV 100, the first support members 725a and 725b would not contact (or otherwise have reduced likelihood of contacting) the second frame portion 720a (including the inner walls of the second frame portion 720a defining the passages or holes 735a and 735b). While the illustrated embodiments show the two passages or holes 735a and 735b for the first support members 725a and 725b, other embodiments may include any suitable number of passages or holes (such as, but not limited to, the passages or holes 735a and 735b).

FIG. 7B shows a schematic diagram of a vibration isolation structure 700b suitable for implementing in a UAV, such as the UAV 100 (FIGS. 1-6) according to some embodiments. The vibration isolation structure 700b may be an alternative implementation to the vibration isolation structure 700a described with reference to FIG. 7A. Referring to FIGS. 1-7B, a first frame portion 710b may correspond to the first frame portion 112. A second frame portion 720b may correspond to the second frame portion 114. A third frame portion 730b may correspond to the third frame portion 116. Each of the first support members 725c and 725d may be a component such as, but not limited to, the first support members 725a and 725b. Each of the second support members 715c and 715d may be a component such as, but not limited to, the second support members 715a and 715b.

The first frame portion 710b may be inelastically coupled to the third frame portion 730b via first support members 725c and 725d, each of which may correspond to one or more of the first support members 140a-140d. Each of the first frame portion 710b, the third frame portion 730b, and the first support member 725c and 725d may be out of direct contact with any part of the second frame portion 720b. The second frame portion 720b may include passages or holes 735c and 735d for the first support members 725c and 725d, respectively to pass through. Each of the passages or holes 735c and 735d may be large enough such that during any movement of the first support members 725c and 725d in normal operation of the UAV 100, the first support members 725c and 725d would not contact (or otherwise have reduced likelihood of contacting) the second frame portion 720b (including the inner walls of the second frame portion 720b defining the passages or holes 735c and 735d). While the illustrated embodiments show the two passages or holes 735c and 735d for the first support members 725c and 725d, other embodiments may include any suitable number of passages or holes (such as, but not limited to, the passages or holes 735c and 735d).

The first frame portion 710b may be elastically coupled to the second frame portion 720b via second support members 715c and 715d, each of which may be similar to one or more of the second support members 145a-145d. The second support members 715c and 715d may be an elastic bushing (e.g., a rubber bushing), elastic grommet (e.g., a rubber grommet), shock absorbers, spring, or the like. The second support members 715c and 715d may couple to the first frame portion 710a and the second frame portion 720a while dampening and, thus, reducing or cancelling vibration or other motions originating from the second frame portion 720a. In particular embodiments, each of the second support members 715c and 715d may include an outer sleeve for a respective one of the first support members 725c and 725d and does not contact the first support members 725c and 725d. The vibration isolation structure 700b conserves space on the UAV 100.

FIG. 7C shows a schematic diagram of a second support member 715e according to some embodiments. Referring to FIGS. 1-7C, the second support member 715e may be a particular implementation of the second support members 145a-145d and 715a-715d in some embodiments. The second support member 715e may be coupled to a frame portion 710c. The frame portion 710c may be one or more of the first frame portion 112, 710a, and 710b or the second frame portion 114, 720a, and 720b in some embodiments in which the second support member 715e elastically couples the first frame portion 112, 710a, and 710b and the second frame portion 114, 720a, and 720b to provide vibration dampening. In further embodiments, the frame portion 710c may also be the third frame portion 116, 730a, and 730b when the second support member 715e elastically couples the third frame portion 116, 730a, and 730b and the second frame portion 114, 720a, and 720b to provide vibration dampening.

The second support member 715e may include at least a head 740a, shaft 745a, and grommet 750a. The head 740a and the shaft 745a may form a bolt-like or nail-like configuration in which the shaft 745a extends from the head 740a. The grommet 750a may be an outer sleeve around a portion of the shaft 745a. The grommet 750a may be made of an elastic material such as, but not limited to, rubber, shock absorber, spring, and/or the like. The head 740a may contact the grommet 750a at bottom surface of the head 740a having a surface area greater than that of the grommet 750a to prevent the grommet 750a from moving past the head 740a. The frame portion 710c may define an opening 760a for the second support member 715e (particularly, the shaft 745a and the grommet 750a) to pass through. The walls defining the opening 760a and the head 740a may hold the grommet 750a in place. The grommet 750a may accordingly dampen vibrations originating from or propagating to the frame portion 710c. In some embodiments, the shaft 745a and the grommet 750a may be inserted into the opening 760a, and the head 740a may be formed thereafter by flattening a portion of the shaft 745a corresponding to the head 740a that protrudes from the opening 760a. That is, the head 740a may be formed from the shaft 745a. The head 740a and the shaft 745a may be made of suitable materials such as, but not limited to, steel, metal, and the like.

FIG. 7D shows a schematic diagram of a second support member 715f according to some embodiments. Referring to FIGS. 1-7D, the second support member 715f may be a particular implementation of the second support members 145a-145d and 715a-715d in some embodiments. The second support member 715f may be coupled to a frame portion 710d, which may be the same as the frame portion 710c.

The second support member 715f may include at least a head 740b, shaft 745b, and grommet 750b. The head 740b and the shaft 745b may form a bolt-like or nail-like configuration in which the shaft 745b extends from the head 740b. The grommet 750b may be an outer sleeve around a portion of the shaft 745b. The grommet 750b may be made of an elastic material such as, but not limited to, rubber, shock absorber, spring, and/or the like. The head 740b may contact the grommet 750b at a bottom surface of the head 740b to prevent the grommet 750b from moving past the head 740b. The frame portion 710d may define an opening 760d for the second support member 715f (particularly, the shaft 745b) to pass through. The grommet 750b may be positioned between the head 740b and the frame portion 710d to dampen vibrations originating from or propagating to the frame portion 710d. In some embodiments, the shaft 745a may be inserted into the opening 760d, and the head 740b may be formed thereafter by flatten a portion of the shaft 745b. That is, the head 740b may be formed from the shaft 745b. The head 740b and the shaft 745b may be made of suitable materials such as, but not limited to, steel, metal, and the like.

Figure 7E:
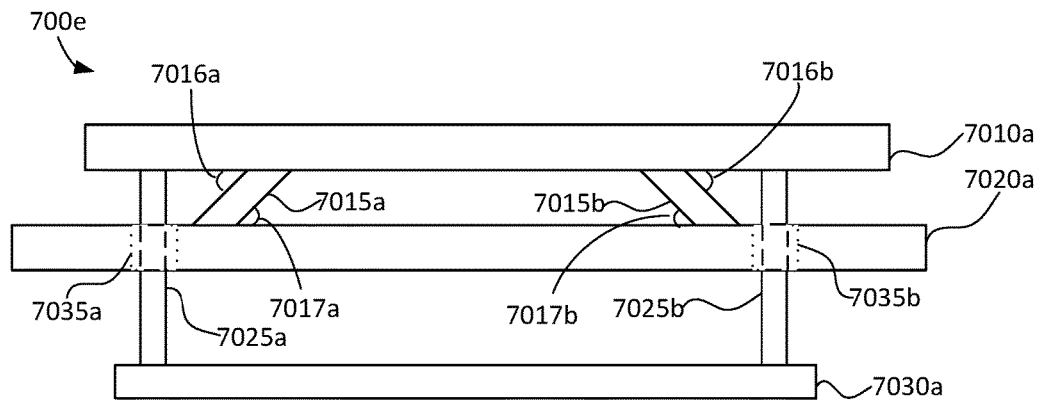
FIG. 7E shows a schematic diagram of a vibration isolation structure suitable for implementing for a UAV according to some embodiments.

FIG. 7E shows a schematic diagram of a vibration isolation structure 700e suitable for implementing for a UAV, such as the UAV 100 (FIGS. 1-6) according to some embodiments. Referring to FIGS. 1-7E, a first frame portion 7010a may correspond to the first frame portion 112. A second frame portion 7020a may correspond to the second frame portion 114. A third frame portion 7030a may correspond to the third frame portion 116. The first frame portion 7010a may be elastically coupled to the second frame portion 7020a via second support members 7015a and 7015b. The second support members 7015a and 7015b may couple the first frame portion 7010a and the second frame portion 7020a while reducing or cancelling vibration or other motions originating from the second frame portion 7020a.

One or more (or each) of the second support members 7015a or 7015b may be angled with respect to the first frame portion 7010a and/or second frame portion 7020a to reduce vibrations originating from the second frame portion 7020a in directions of translation and/or rotation. For example, one or more (or each) of the second support members 7015a or 7015b may be arranged at an oblique angle relative to a horizontal plane of one or both major surfaces (horizontal surfaces in FIG. 7E), or oblique angles relative to the vertical orientation of the first support members 7025a and 7025b. In certain embodiments, the angle of the one or more (or each) second support member 7015a and 7015b is such that one end of each angled second support member 7015a and 7015b is coupled to the first frame portion 7010a at a location closer to the center of the first frame portion 7010a than the relative location of the second end of each angled second support member 7015a and 7015b. In addition, the second end of each angled second support member 7015a and 7015b is coupled to the second frame portion 7020a at a location further from the center of the second frame portion 7020a than the relative location of the first end of each angled second support member 7015a and 7015b. The second support members 7015a and 7015b may extend from the first frame portion 7010a outward to the second frame portion 7020a. For example, a first angle 7016a or second angle 7016b may be any angle less than 90°. Illustrating with a non-limiting example, one or more of the first angle 7016a or second angle 7016b may be 45°. Illustrating with another non-limiting example, one or more of the first angle 7016a or second angle 7016b may be 60°. Illustrating with yet another non-limiting example, one or more of the first angle 7016a or second angle 7016b may be 30°. Similarly, one or more of the third angle 7017a or fourth angle 7017b may be any angle less than 90°. Illustrating with a non-limiting example, one or more of the third angle 7017a or fourth angle 7017b may be 45°. Illustrating with another non-limiting example, one or more of the third angle 7017a or fourth angle 7017b may be 60°. Illustrating with yet another non-limiting example, one or more of the third angle 7017a or fourth angle 7017b may be 30°.

The first frame portion 7010a may be inelastically coupled to the third frame portion 7030a via first support members 7025a and 7025b, each of which may correspond to one or more of the first support members 140a-140d. Each of the first frame portion 7010a, the third frame portion 7030a, and the first support member 7025a and 7025b may be arranged out of direct contact with any part of the second frame portion 7020a. The second frame portion 7020a may include passages or holes 7035a and 7035b for the first support members 7025a and 7025b, respectively, to pass through. Each of the holes 7035a and 7035b may be large enough such that, during any movement of the first support members 7025a and 7025b in normal operation of the UAV 100, the first support members 7025a and 7025b would not contact (or otherwise have reduced likelihood of contacting) the second frame portion 7020a (including the inner walls of the second frame portion 7020a defining the passages or holes 7035a and 7035b). While the illustrated embodiments show the two passages or holes 7035a and 7035b for the first support members 7025a and 7025b, other embodiments may include any suitable number of passages or holes (such as, but not limited to, the passages or holes 7035a and 7035b).

Figure 7F:
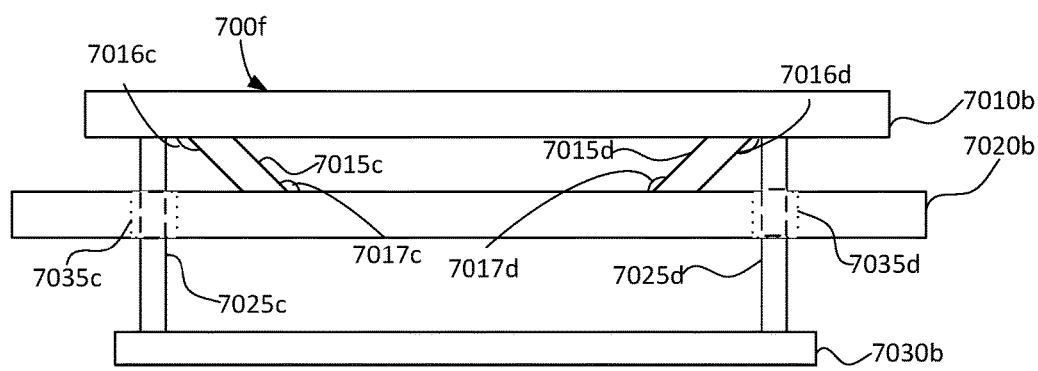
FIG. 7F shows a schematic diagram of a vibration isolation structure suitable for implementing for a UAV according to some embodiments.

FIG. 7F shows a schematic diagram of a vibration isolation structure 700f suitable for implementing for a UAV, such as the UAV 100 (FIGS. 1-6) according to some embodiments. Referring to FIGS. 1-7F, a first frame portion 7010b may correspond to the first frame portion 112. A second frame portion 7020b may correspond to the second frame portion 114. A third frame portion 7030b may correspond to the third frame portion 116. Each of the first support members 7025c and 7025d may be a component such as, but not limited to, the first support members 7025a and 7025b.

The first frame portion 7010b may be inelastically coupled to the third frame portion 7030b via first support members 7025c and 7025d, each of which may correspond to one or more of the first support members 140a-140d. The first frame portion 7010b may be elastically coupled to the second frame portion 7020b via second support members 7015c and 7015d.

One or more of the second support members 7015c or 7015d may be angled with respect to the first frame portion 7010 and/or second frame portion 7020a to reduce vibrations originating from the second frame portion 7020a in directions of translation and/or rotation. For example, one or more (or each) of the second support members 7015c or 7015d may be arranged at an oblique angle relative to a horizontal plane of one or both major surfaces (horizontal surfaces in FIG. 7F), or oblique angles relative to the vertical orientation of the first support members 7025c and 7025d. In certain embodiments, the angle of the one or more (or each) second support member 7015c and 7015d is such that one end of each angled second support member 7015c and 7015d is coupled to the first frame portion 7010a at a location further from the center of the first frame portion 7010b than the relative location of the second end of each angled second support member 7015c and 7015d. In addition, the second end of each angled second support member 7015c and 7015d is coupled to the second frame portion 7020b at a location closer to the center of the second frame portion 7020b than the relative location of the first end of each angled second support member 7015c and 7015d. The second support members 7015c and 7015c may extend from the first frame portion 7010a inward to reach the second frame portion 7020a. For example, a first angle 7016c or second angle 7016d may be any angle greater than 90°. Illustrating with a non-limiting example, one or more of the first angle 7016c or second angle 7016d may be 45°. Illustrating with another non-limiting example, one or more of the first angle 7016c or second angle 7016d may be 60°. Illustrating with yet another non-limiting example, one or more of the first angle 7016c or second angle 7016d may be 30°. Similarly, one or more of the third angle 7017c or fourth angle 7017d may be any angle less than 90°. Illustrating with a non-limiting example, one or more of the third angle 7017c or fourth angle 7017d may be 45°. Illustrating with another non-limiting example, one or more of the third angle 7017c or fourth angle 7017d may be 60°. Illustrating with yet another non-limiting example, one or more of the third angle 7017c or fourth angle 7017d may be 30°.

The first frame portion 7010b may be inelastically coupled to the third frame portion 7030b via first support members 7025c and 7025d, each of which may correspond to one or more of the first support members 140a-140d. Each of the first frame portion 7010b, the third frame portion 7030b, and the first support member 7025c and 7025d may be arranged out of direct contact with any part of the second frame portion 7020b. The second frame portion 7020b may include passages or holes 7035c and 7035d for the first support members 7025c and 7025d, respectively, to pass through. Each of the holes 7035c and 7035d may be large enough such that, during any movement of the first support members 7025c and 7025d in normal operation of the UAV 100, the first support members 7025c and 7025d would not contact (or otherwise have reduced likelihood of contacting) the second frame portion 7020b (including the inner walls of the second frame portion 7020b defining the passages or holes 7035c and 7035d). While the illustrated embodiments show the two passages or holes 7035c and 7035d for the first support members 7025c and 7025d, other embodiments may include any suitable number of passages or holes (such as, but not limited to, the passages or holes 7035c and 7035d).

Figure 8:
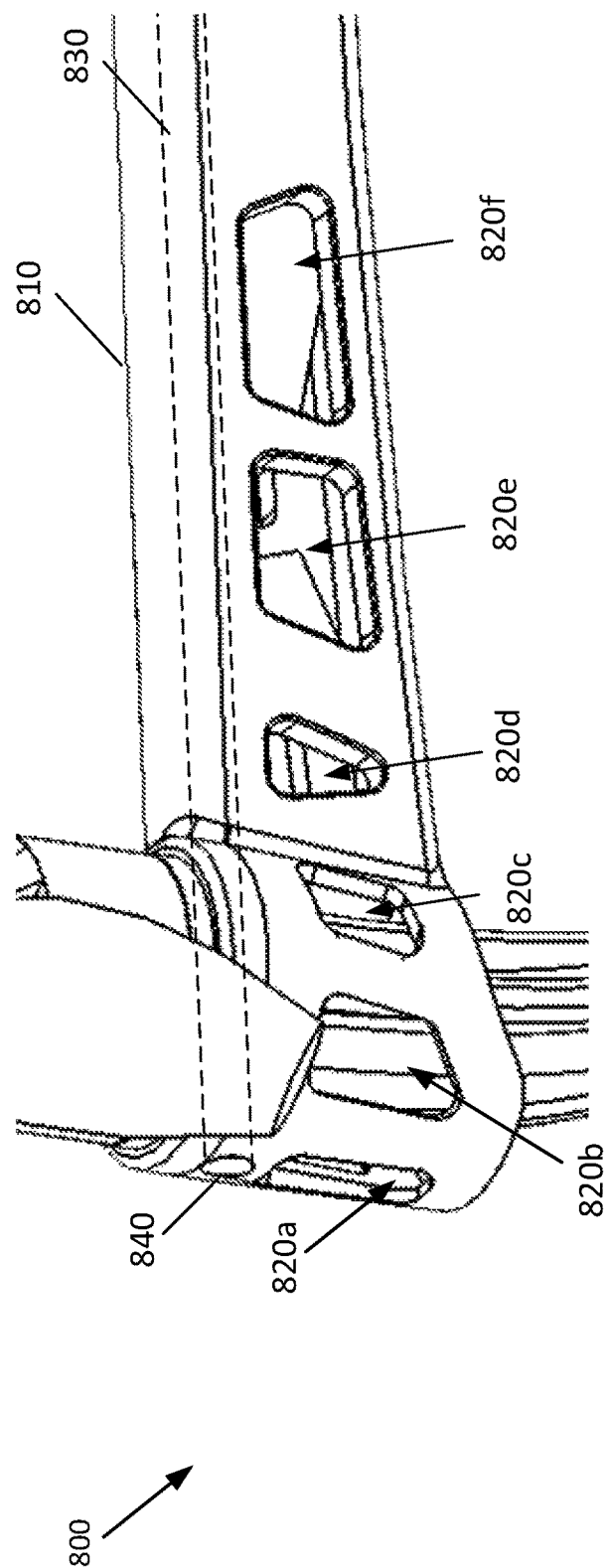
FIG. 8 shows a perspective view of a portion of a frame structure of a UAV according to various embodiments.

FIG. 8 shows a perspective view of a frame portion 800 of a UAV, such as the UAV 100 (FIGS. 1-7D) according to various embodiments. Referring to FIGS. 1-8, the frame portion 800 may be a part of the frame structure 110 according to various embodiments. In a non-limiting example, the frame portion 800 is a part of an arm section 114a, 114b, 114c, or 114d of the second frame portion 114. However, one of ordinary skill in the art would appreciate that the features described with respect to the frame portion 800 may likewise be implemented for the first frame portion 112, the third frame portion 116, or any other portions of the frame structure 110.

The frame portion 800 may include a main frame structure 810 of the frame portion 800, where the main frame structure 810 is formed of one or more first materials. The one or more first materials may be one or more materials that can be readily formed into a desired shape of a frame portion 800 for the UAV 100. In particular embodiments, the first material may be a material that is relatively light in weight and mass, to minimize power requirements for the UAV 100. For example, the first material may be at least one of plastic, Styrofoam, ceramic, or the like. The main frame structure 810 may have one or more apertures or openings 820a-820f, to minimize weight. The first material may be a material that can be readily employed in suitable manufacturing techniques for forming shaped components, such as a desired shape of the frame portion 800. In particular embodiments, the first material may be suitable for forming such shaped components, including the frame portion 800, by manufacturing techniques such as, but not limited to 3D modeling, rapid prototyping, molding, or the like. In further embodiments, some or all features of the frame portion 800 are formed by machining techniques, including, but not limited to cutting, drilling, grinding, and the like.

The main frame structure 810 also includes one or more passages 840, in which a sub-frame structure 830 is located. The sub-frame structure 830 may be made of one or more second materials, different from the first materials. In particular embodiments, the second material may be a material that has a relatively high strength, rigidity, stiffness or other characteristic desired for the frame portion 800. For example, the second material may be one or more of carbon fiber, steel, other metal, or the like. Thus, the combination of the first material (the first structure 810) and the second material (forming a second structure not shown) may allow the UAV 100 to be rapidly prototyped and have the desired structural integrity, stiffness, and rigidity.

The sub-frame structure 830 may be a shaft or rod-shaped structure that is inserted into (or molded or otherwise formed into) the one or more passages 840 in the main frame structure 810. In certain embodiments, each arm section 114a, 114b, 114c, or 114d of the second frame portion 114 (720a or 720b) includes one or more passages 840 extending along the arm section 114a, 114b, 114c, or 114d, for receiving a respective shaft or rod of the sub-frame 830, to add structural strength, stiffness or rigidity (or any combination thereof) to the arm section 114a, 114b, 114c, or 114d. In such embodiments, the shafts or rods of the sub-frame for the arm sections 114a, 114b, 114c, or 114d may extend into a center section of the frame structure 110, where one end of the shafts or rods of the sub-frame may be coupled together. In other embodiments, the sub-frame 830 includes a plurality of shafts or rods (for example, within a plurality of the arm sections 114a-114d), where such shafts or rods are not directly connected to each other. In particular embodiments, the sub-frame may be formed in one or more shafts or rod-shapes for ease of manufacture, but may be increase strength, rigidity or stiffness of a more complex-shaped, light-weight main frame structure.

Figure 9:
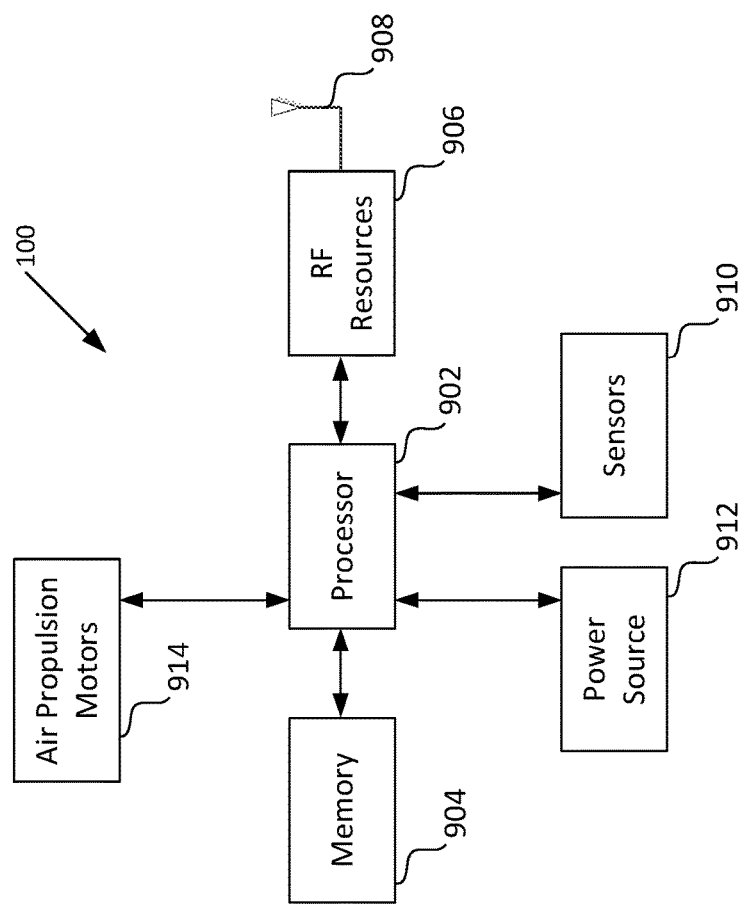
FIG. 9 shows a schematic diagram of various components of a UAV according to some embodiments.

FIG. 9 shows a schematic diagram of various components of a UAV, such as the UAV 100 according to some embodiments. With reference to FIGS. 1-9, the UAV 100 is shown as having a processor 902 and a memory 904. The processor 902 and the memory 904 may be effective together to store and run software related to controlling the operation of the UAV 100. The processor 902 may process software related to controlling speed of rotation of air propulsion motors 914 (which may correspond to and/or be associated with the rotor motors 132 of the aerial propulsion devices 130). The processor 902 may process software related to storing or processing data received from sensors 910. The processor 902 may process software related to performing wireless communications with another device using one or more RF resources 906 and antenna 908. The processor 902 along with other components of the UAV 100 may receive electrical power from power source 912 (e.g., the battery 150). The air propulsion motors 914 may be arranged on the second frame portion 114. The processor 902, memory 904, RF resources 906 (or other communication electronics), antenna 908, power source 912, and sensors 910 may be arranged on either the first frame portion 112 or the third frame portion 116.

Through control of the aerial propulsion motors 914, the UAV 100 may be controlled in flight as the UAV 100 progresses toward a destination. The sensors 910 may include a navigation unit. The processor 902 may receive data from the navigation unit and use such data in order to determine the present position and orientation of the UAV 100, as well as the appropriate course towards the destination. In some embodiments, the navigation unit may include a Global Navigation Satellite System (GNSS) receiver system (e.g., one or more GPS receivers) enabling the UAV 100 to navigate using GNSS signals. Alternatively or in addition, the navigation unit may be equipped with radio navigation receivers for receiving navigation beacon or other signals from radio nodes, such as navigation beacons (e.g., Very High Frequency (VHF) Omni Directional Radio Range (VOR) beacons), Wi-Fi access points, cellular network sites, radio station, etc. Additionally, the processor 902 and/or the navigation unit may be configured to communicate with a server through a wireless connection (e.g., a cellular data network) to receive data useful in navigation as well as provide real-time position reports.

The sensors 910 may include an avionics module coupled to the processor 902 and/or the navigation unit may provide flight control-related information such as altitude, attitude, airspeed, heading and similar information that the navigation unit may use for navigation purposes, such as dead reckoning between GNSS position updates. The avionics module may include or receive data from a gyro/accelerometer unit (arranged on either the first frame portion 112 or the third frame portion 116) that provides data regarding the orientation and accelerations of the UAV 100 that may be used in navigation calculations.

The RF resources 906 (or other communication electronics) and the processor 902 may implement a radio module configured to receive navigation signals, such as beacon signals from restricted areas, signals from aviation navigation facilities, etc., and provide such signals to the processor 902 and/or the navigation unit to assist in UAV navigation. In some embodiments, the navigation unit may use signals received from recognizable RF emitters (e.g., AM/FM radio stations, Wi-Fi access points, and cellular network base stations) on the ground. The locations, unique identifiers, signal strengths, frequencies, and other characteristic information of such RF emitters may be stored in a database and used to determine position (e.g., via triangulation and/or trilateration) when RF signals are received. Such a database of RF emitters may be stored in the memory 904 of the UAV 100, in a ground-based server in communication with the processor 902 via a wireless communication link, or in a combination of the memory 904 and a ground-based server.

Navigating using information about RF emitters may use any of a number of conventional methods. For example, upon receiving an RF signal via the RF resources 906, the processor 902 may obtain the signals unique identifier (e.g., a Service Sector Identification (SSID), a Media Access Control (MAC) address, radio station call sign, cell ID, etc.), and use that information to obtain the ground coordinates and signal strength of the detected RF emitter from the database of RF emitter characteristics. If the database is stored in the onboard memory 904, the processor 902 may use the emitter identifier information to perform a table look up in the database. Alternatively or in addition, the processor 902 may use the radio module to transmit the detected RF emitter identifier to a Location Information Service (LIS) server, which may return a location of the RF emitter obtained an RF emitter location database. Using the RF emitters coordinates and optionally the signal strength characteristics, the processor 902 (or the navigation unit) may estimate the location of the UAV 100 relative to those coordinates. Using locations of three or more RF emitters detected, the processor 902 may determine a more precise location via trilateration. Estimates of location based on received ground-based RF emitters may be combined with position information from a GNSS receiver to provide more precise and reliable location estimates than achievable with either method alone.

The processor 902 may use the RF resources 906 to conduct wireless communications with a variety of wireless communication devices such as beacon, a server, smartphone, tablet, or other device with which the UAV 100 may be in communication. A bi-directional wireless communication link may be established between antenna 908 of the RF resources 906 and transmit/receive antenna of the wireless communication device. For example, the wireless communication device may be a beacon that controls access to a restricted area as described herein. In an example, the wireless communication device may be a cellular network base station or cell tower. The radio module may be configured to support multiple connections with different wireless communication devices having different radio access technologies. In some embodiments, the wireless communication device may be connected to a server or provides access to a server. In an example, the wireless communication device may be a server of a UAV operator, a third party service (e.g., package delivery, billing, etc.), or an operator of a restricted area. The UAV 100 may communicate with a server through an intermediate communication link such as one or more network nodes or other communication devices.

In some embodiments, the radio module may be configured to switch between a cellular connection and a Wi-Fi connection depending on the location and altitude of the UAV 100. For example, while in flight at an altitude designated for UAV traffic, the radio module may communicate with a cellular infrastructure in order to maintain communications with a server. An example of a flight altitude for the UAV 100 may be at around 400 feet or less, such as may be designated by a government authority (e.g., FAA) for UAV flight traffic. At this altitude, it may be difficult to establish communication with some of the wireless communication devices using short-range radio communication links (e.g., Wi-Fi). Therefore, communications with other wireless communication devices may be established using cellular telephone networks while the UAV 100 is at flight altitude. Communication between the radio module and the wireless communication device may transition to a short-range communication link (e.g., Wi-Fi or Bluetooth) when the UAV 100 moves closer to the wireless communication device.

The wireless communication device may also be a server associated with the operator of the UAV 100, which communicates with the UAV 100 through a local access node or through a data connection maintained through a cellular UAV 100 are illustrated as separate components, some or all of the components (e.g., the processor 902, the air propulsion motors 914, the RF resources 906, and other units) may be integrated together in a single device or module, such as a system-on-chip module.

Figure 10A:
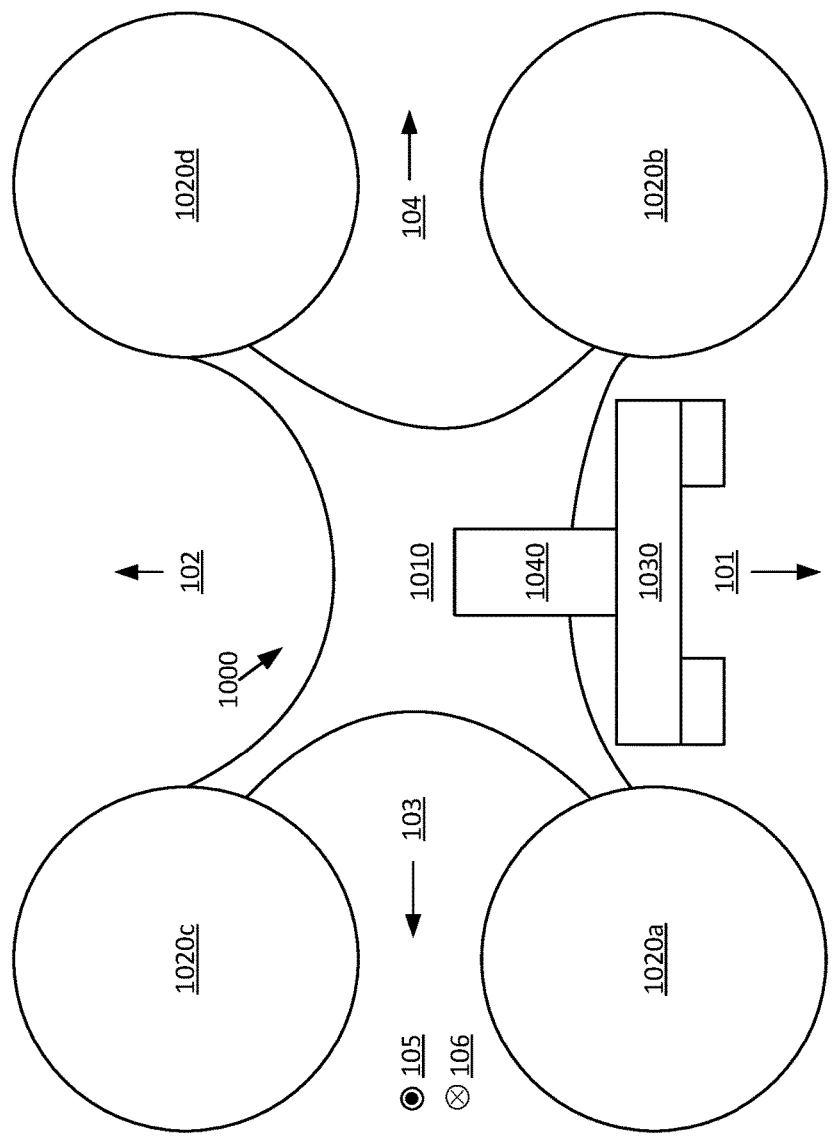
FIG. 10A shows a schematic diagram of a UAV having a camera module positioned relative to the propellers to avoid downwash generated by propellers according to some embodiments.

FIG. 10A shows a schematic diagram of a UAV 1000 having a camera module 1030 positioned relative to propellers (the propellers 134 in FIGS. 1-6) to avoid downwash generated by the propellers according to some embodiments. Referring to FIGS. 1-10A, the UAV 1000 may be the UAV 100 in a top schematic view according to various embodiments. A frame structure 1010 may correspond to the frame structure 110. Downwash areas 1020a-1020d may be generated by propellers 134 and represent cross sections of air currents generated by the propellers 134. The air currents may be propagating in a direction of lift (e.g., in the bottom direction 106) due to the spin of the propellers 134. For example, the downwash areas 1020a-1020d may be areas influenced by the air currents generated by the propellers 134. The camera module 1030 may be provided in the direction of lift with respect to the propellers 134 and may vibrate due to the air currents if within the downwash areas 1020a-1020d. The camera module 1030 may include a camera such as the camera 155. The camera module 1030 may further include any support structure and platform for securing the camera 155 to the frame structure 1010 (e.g., the third frame portion 116). The camera module 1030 may be fixed to or may be a part of the third frame portion 116.

The camera module 1030 (including the camera 155) may be positioned to avoid the downwash areas 1020a-1020d. In particular embodiments, the entire camera module 1030 and the camera 155 is arranged to clear (i.e., outside the areas of) the downwash areas 1020a-1020d. In further embodiments, given that the camera module 1030 may be arranged on a third frame portion 1040 (e.g., corresponding to the third frame portion 116), the entire third frame portion 1040 may clear the downwash areas 1020a-1020d to avoid vibrations caused by air currents in the downwash areas 1020a-1020d.

Figure 10B:
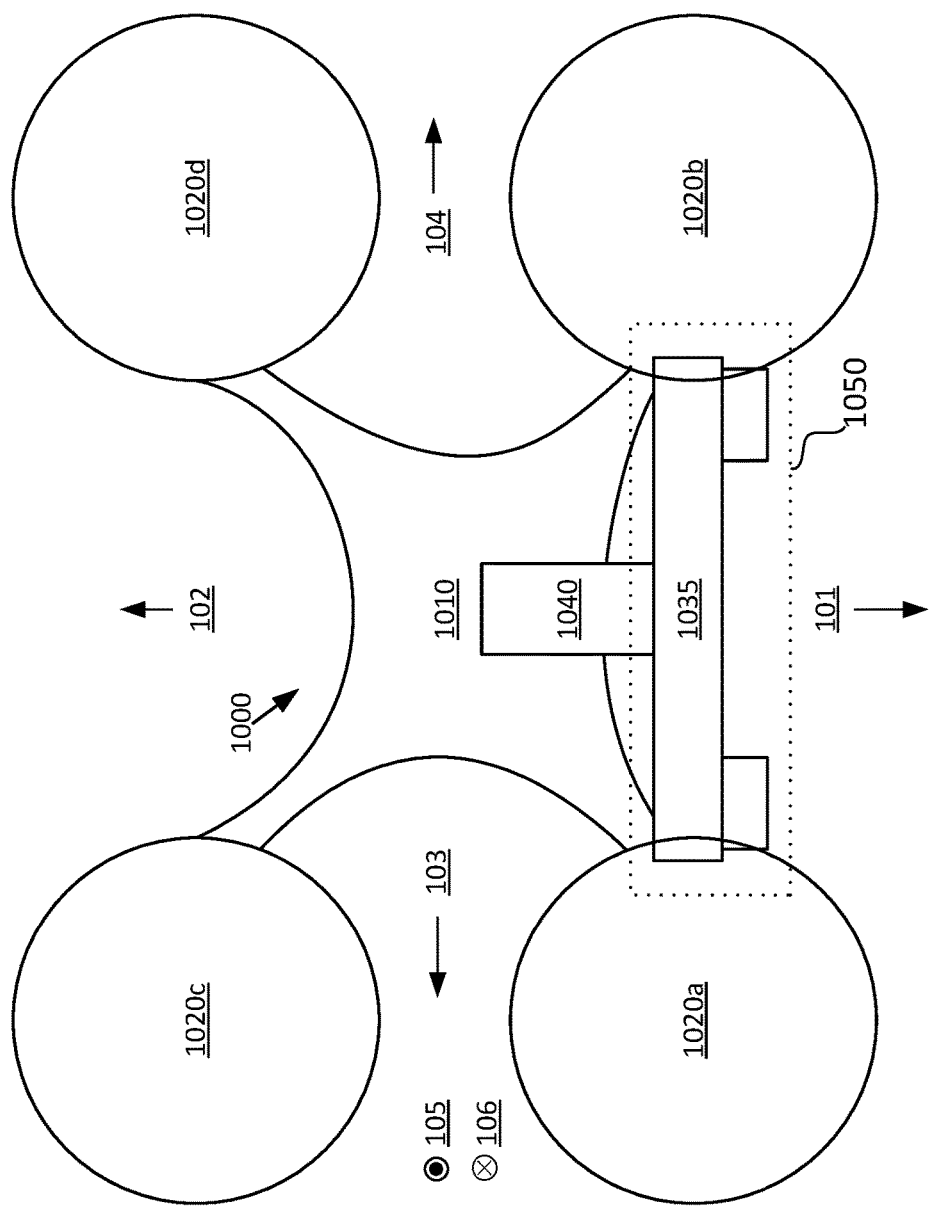
FIG. 10B shows a schematic diagram of a UAV having a camera module shielded from downwash generated by propellers by a visor according to some embodiments.

FIG. 10B shows a schematic diagram of the UAV 1000 having a camera module 1035 shielded from downwash generated by propellers (the propellers 134 in FIGS. 1-6) by a visor 1050 according to some embodiments. Referring to FIGS. 1-10B, at least a portion of the camera module 1035 and/or the camera 155 may be within the downwash areas (e.g., the downwash areas 1020a and 1020b) created by the propellers 134. A visor 1050 may be provided between the camera module 1035 and the propellers 134 in the direction of lift (e.g., the bottom direction 106) to shield the camera module 1035 and/or the camera 115 from the air currents in the downwash areas 1020a and 1020b. An example of the visor 1050 may be the visor 165. The visor 1050 may cover at least the part of the camera module 1035 and/or the camera 155 itself exposed within the downwash areas 1020a and 1020b.

Figure 11:
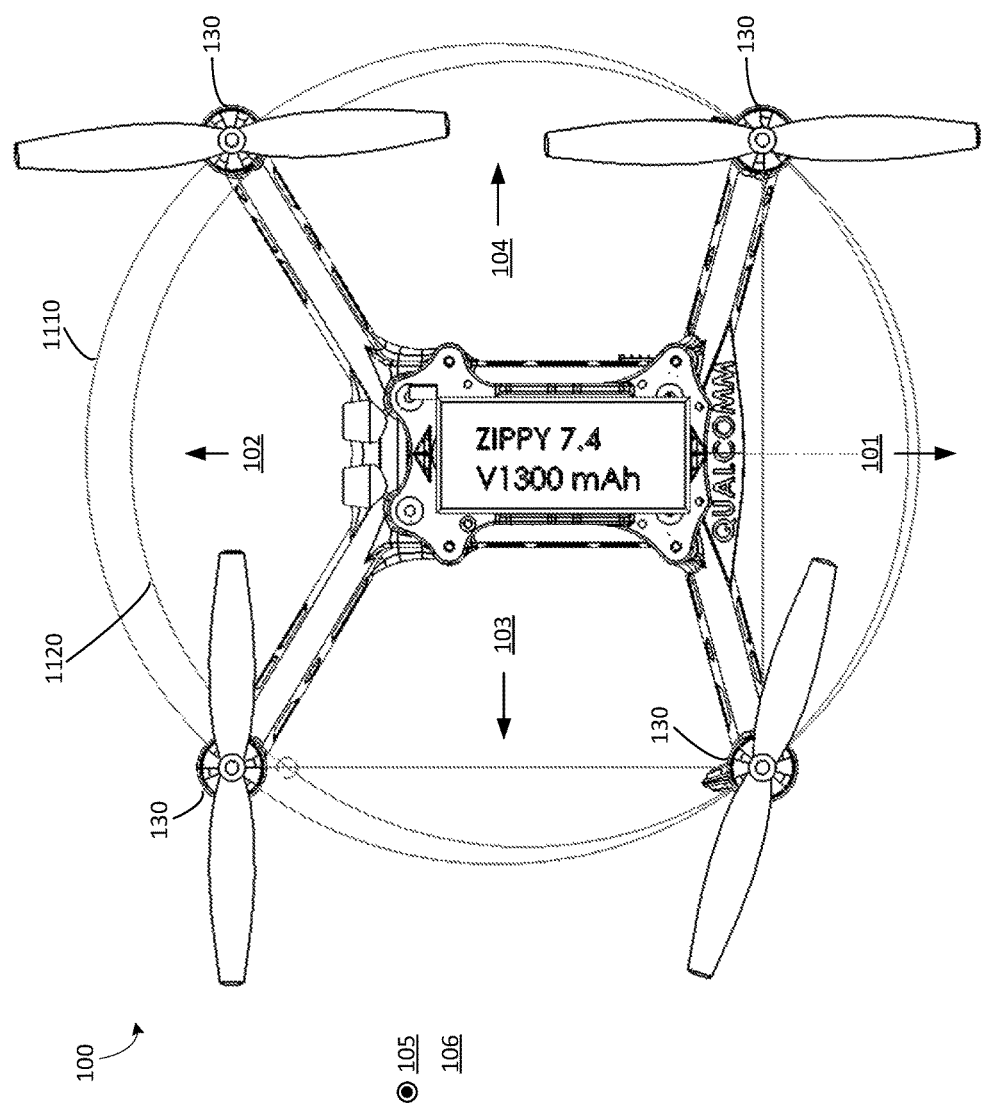
FIG. 11 shows a top view of a UAV according to some embodiments.

FIG. 11 shows a top view of the UAV 100 according to some embodiments. Referring to FIGS. 1-11, dimensions of the UAV 100 may be characterized by at least one (substantially) circular shape such as, but not limited to, a first circular shape 1110 and a second circular shape 1120. Each of the circular shapes 1110 and 1120 may be designated with respect to the top view shown in FIG. 11. A circumference of each of the circular shapes 1110 and 1120 may pass through at least a portion of at least one of the aerial propulsion devices 130. For example, the circumference of the first circular shape 1110 may pass through all four aerial propulsion devices 130. The circumference of the second circular shape 1120 may pass through two aerial propulsion devices 130. In further embodiments, circumferences of additional circular shapes may pass through one, three, or five or more (in embodiments of the UAV 100 having five or more aerial propulsion devices such as, but not limited to, the aerial propulsion devices 130) of the aerial propulsion devices 130. The diameter or radius of each of the first circular shape 1110 and the second circular shape 1120 may be, for example, 180 mm, 200 mm, 220 mm, 230 mm, 240 mm, 250 mm, 260 mm, 300 mm, 360 mm, or the like.

Figure 12:
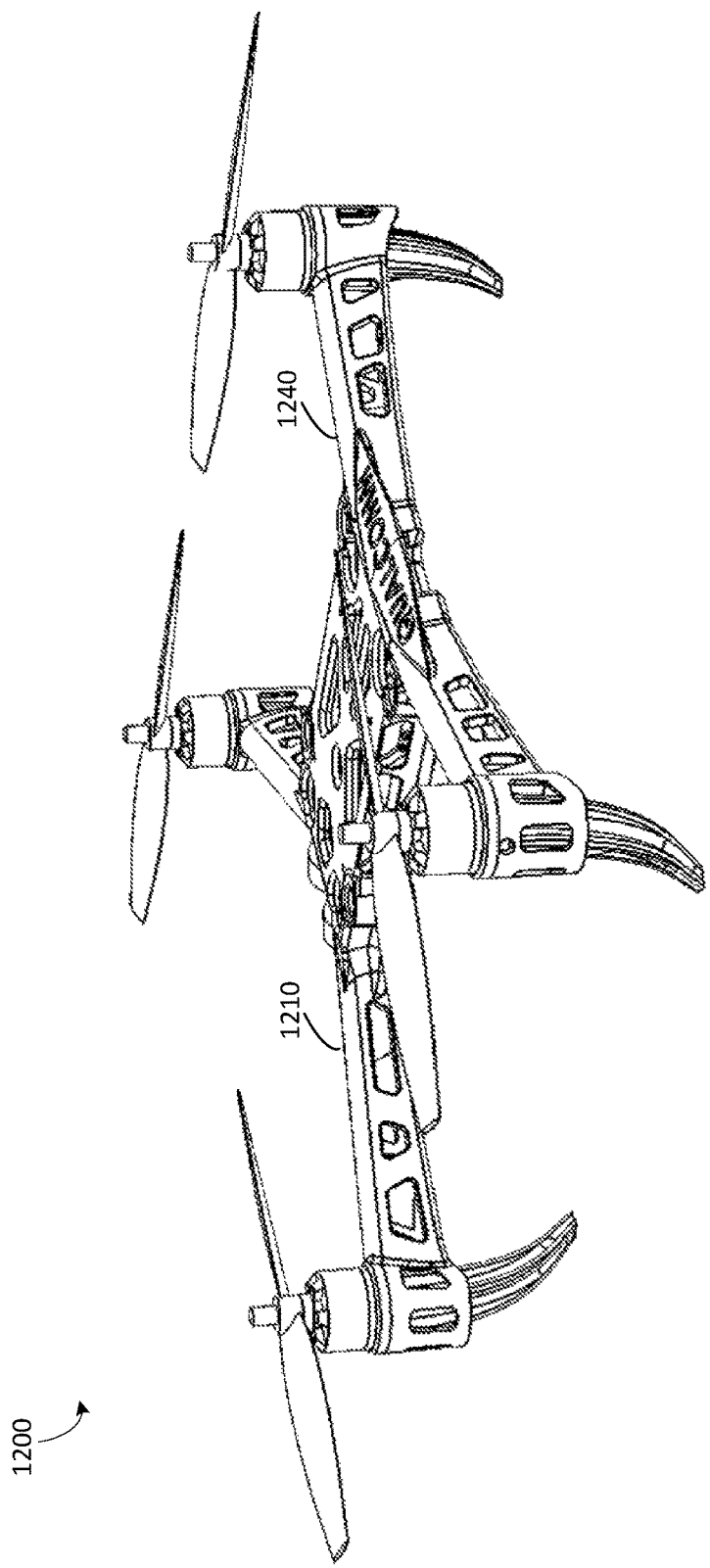
FIG. 12 shows a perspective view of a UAV according to some embodiments.

FIG. 12 shows a perspective view of a UAV 1200 according to some embodiments. Referring to FIGS. 1-12, the UAV 1200 may have a frame structure 1210 such as, but not limited to, the frame structure 110 of the UAV 100. The frame structure 1210 may include at least a frame portion 1240 corresponding to the second frame portion 114. In some embodiments, the UAV 1200 may have the same properties and characteristics as those of the UAV 100 except that the frame structure 1210 does not include frame portions corresponding to the first frame portion 112 and the third frame portion 116. That is, the frame structure 1210 of the UAV 1200 may not have the three-layer configuration of the UAV 100. The three-layer configuration of the UAV 100 may refer to the combination of the first frame portion 112, the second frame portion 114, and the third frame portion 116 as described. Components of the UAV 1200 such as, but not limited to, batteries, cameras, sonars, sensors, RF resources, processors, memory, flight controllers, and the like may be arranged on the frame portion 1240, given that frame structure 1210 does not have frame portions corresponding to the first frame portion 112 and the third frame portion 116.

FIG. 13A shows a top view of a first frame portion 1310 according to some embodiments. Referring to FIGS. 1-13A, the first frame portion 1310 may be an example of the first frame portion 112, first frame portion 710a, first frame portion 710b, and/or the like in some embodiments. The first frame portion 1310 may have a first length L1 and a first width W1. Illustrating with a non-limiting example, the first length L1 may be 94.63 mm and the first width W1 may be 64.29 mm. Illustrating with another non-limiting example, the first length L1 may be 50 mm, 80 mm, 120 mm, or the like, and the first width W1 may be 30 mm, 50 mm, 900 mm, or the like. In some embodiments, the first frame portion 1310 and any component (e.g., the battery 150) arranged thereon may have a combined weight of 71 g. In other embodiments, the first frame portion 1310 may have other suitable length and width dimensions, and weights.

FIG. 13B shows a top view of a third frame portion 1320 according to some embodiments. Referring to FIGS. 1-13A, the third frame portion 1320 may be an example of the third frame portion 116, third frame portion 730a, third frame portion 730b, and/or the like in some embodiments. The third frame portion 1320 may have a second length L2 and a second width W2. In some embodiments, the dimensions of the third frame portion 1320 may be the same as the dimensions of the first frame portion 1310. Illustrating with a non-limiting example in which the first length L1 may be 94.63 mm and the first width W1 may be 64.29 mm, the second length L2 may be 106.93 mm and the second width W2 may be 95.44 mm. In some embodiments, the dimensions (e.g., the second width W2, the second length L2, and/or the like) of the third frame portion 1320 may be substantially similar to (e.g., within 15% of) the dimensions (e.g., the first width W1, the first length L1, and/or the like) of the first frame portion 1310. Illustrating with another non-limiting example in which the first length L1 may be 102 mm and the first width W1 may be 70 mm, the second length L2 may be 100 mm and the second width W2 may be 65.32 mm. In other embodiments, the first frame portion 1310 may have other suitable length and width dimensions.

In some embodiments, the weight of the third frame portion 1320 (and any components arranged thereon) may be less than the weight of the first frame portion 1310 (and any components arranged thereon) for stabilization. The top frame portion (e.g., the first frame portion 1310 and any components arranged thereon) having more weight than the bottom frame portion (e.g., the third frame portion 1320 and any components arranged thereon) may allow offsetting of momentum of the bottom frame portion while the UAV is in motion to avoid or reduce wavering of the combined mass of the top frame portion and the bottom frame portion. In some embodiments, the weight of the third frame portion 1320 (and any components arranged thereon, such as, but not limited to, the camera 155) may be half or approximately half or a third of the weight of the first frame portion 1310 (and any components arranged thereon). Illustrating with a non-limiting example, the first frame portion 1310 (and any components arranged thereon) may weigh 71 g, and the third frame portion 1320 (and any components arranged thereon) may weigh 27 g. Illustrating with another non-limiting example, the first frame portion 1310 (and any components arranged thereon) may weigh 84 g, and the third frame portion 1320 (and any components arranged thereon) may weigh 42 g. Illustrating with yet another non-limiting example in which the first frame portion 1310 (and any components arranged thereon) may weigh 84 g, the third frame portion 1320 (and any components arranged thereon) may weigh 47 g.

In some embodiments, more weight may be added to the first frame portion 1310 for improved stability under certain circumstances, such as, but not limited to, windy flight conditions. More weight may be added to the first frame portion 1310 by arranging additional components such as, but not limited to, additional sensors, batteries, and/or any mass having a weight to the first frame portion 1310.

FIG. 13C shows a top view of the first frame portion 1310 (FIG. 13A) and third frame portion 1320 (FIG. 13C) as assembled for a UAV (such as, but not limited to, the UAV 100 (FIG. 1)). Other components of the UAV 100 may be omitted for clarity. The contours of the first frame portion 1310 may be substantially similar to the contours of the third frame portion 1320. In some embodiments, the first frame portion 1310 may be slightly larger than the third frame portion 1320. In other embodiments, the third frame portion 1320 may be slightly larger than the first frame portion 1310.

Figure 14:
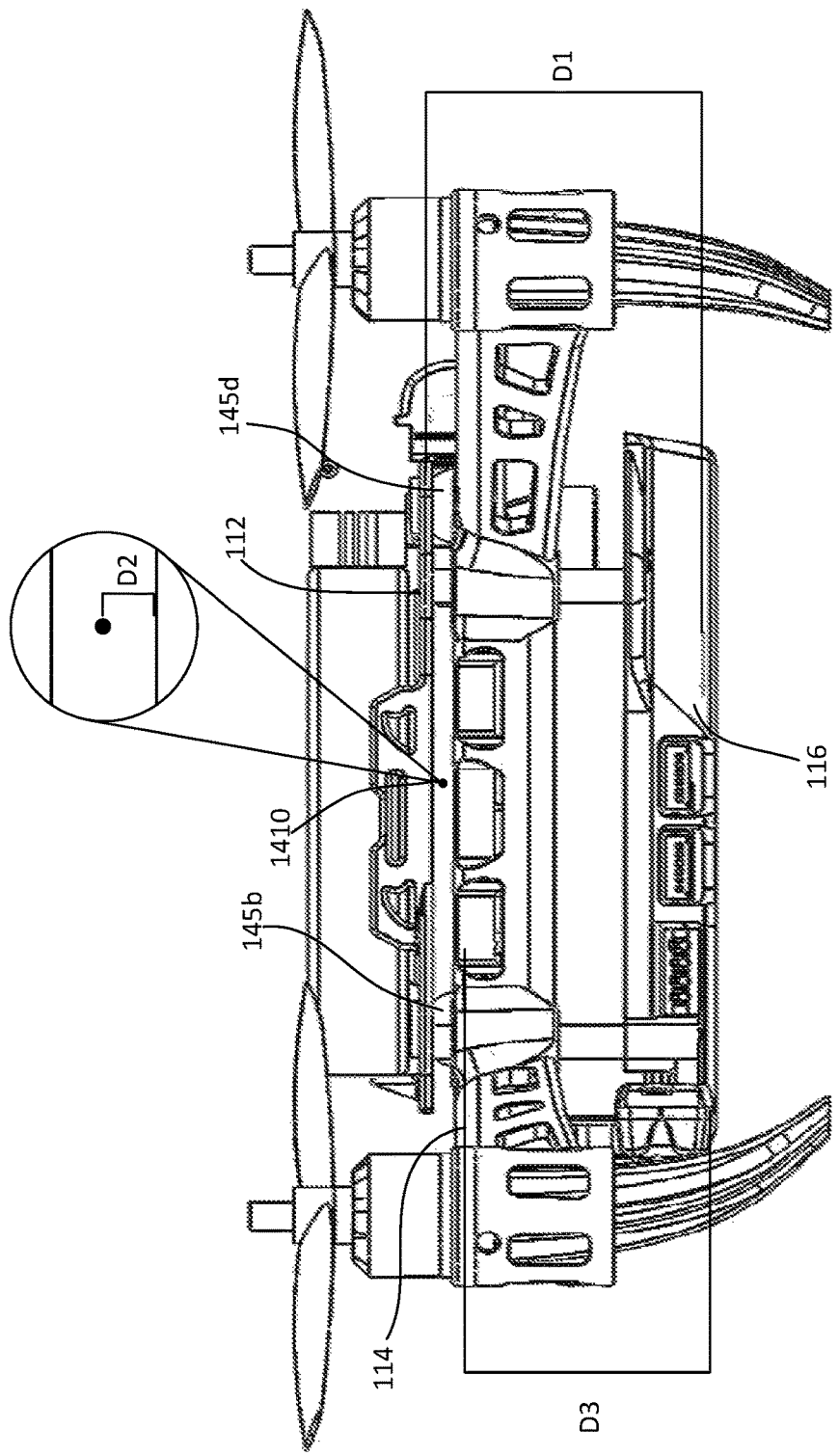
FIG. 14 shows a side view of a UAV according to some embodiments.

FIG. 14 shows a side view of the UAV 100 according to some embodiments. Referring to FIGS. 1-14, illustrating with a non-limiting example, a first distance D1 between the first frame portion 112 and the third frame portion 116 may be 35.6 mm. The first frame portion 112 (and any components arranged thereon) may weigh 71 g. The third frame portion 116 (and any components arranged thereon) may weigh 27 g (i.e., less than the weight of the first frame portion 112). A center of mass 1410 of the UAV 100 may be above the second frame portion 114. For example, a second distance D2 between the center of mass 1410 and the second frame portion 114 (e.g., a first surface of the second frame portion 114 facing the first frame portion 112) may be 2 mm. A third distance D3 between the second frame portion 114 (e.g., a second surface of the second frame portion 114 facing the third frame portion 116) and the third frame portion 116 (e.g., a surface of the third frame portion 116 that faces the second face of the second frame portion 114) may be 30.3 mm. That is, the third distance D3 may be greater than the second distance D2. In another example, the center of mass 1410 may align with a bottom of the second support members 145*b* and 145*d*. This may indicate that the payload provided on one or more of the first frame portion 112 or third frame portion 116 may be balanced on the second support members 145*a*-145*d*. Please note that the dimensions provided in the illustrated embodiments are merely exemplary and that other dimensions (e.g., distances) and weights for a UAV (e.g., the UAV 100) can be implemented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An Unmanned Aerial Vehicle (UAV), comprising:
   a first frame portion, a second frame portion, and a third frame portion, each separated from one another, wherein the second frame portion defines at least one hole;
   at least one first support member coupled between the first frame portion and the third frame portion; and
   at least one second support member, coupled between the second frame portion and one or more of the first frame portion or the third frame portion, and configured to isolate the first frame portion and the third frame portion from vibration of the second frame portion;
   wherein the at least one first support member is arranged to extend from the first frame portion and through the at least one hole to couple to the third frame portion.

2. The UAV of claim 1, wherein the second frame portion is arranged between the first frame portion and the third frame portion.

3. The UAV of claim 1, further comprising at least one aerial propulsion device arranged on the second frame portion.

4. The UAV of claim 3, wherein:
   the at least one aerial propulsion device generates vibration that is propagated through the second frame portion; and
   the at least one second support member is configured to isolate the one or more of the first frame portion or the third frame portion from the vibration generated by the at least one aerial propulsion device.

5. The UAV of claim 1, further comprising a battery arranged on the first frame portion.

6. The UAV of claim 5, further comprising at least one of a camera, a sensor, a radio-frequency (RF) resource, a processor, or a memory arranged on the third frame portion.

7. The UAV of claim 1, wherein the first frame portion is coupled to the third frame portion via only the first support member.

8. The UAV of claim 1, wherein the second frame portion is coupled to the one or more of the first frame portion or the third frame portion via only the at least one second support member.

9. The UAV of claim 1, wherein the first frame portion and the third frame portion are configured to move as a single mass relative to the second frame portion.

10. The UAV of claim 1, wherein the at least one first support member comprises one or more of a rod, a beam, a shaft, a shackle, a clamp, or a bolt.

11. The UAV of claim 1, wherein the at least one second support member comprises one or more of a rubber bushing, a rubber grommet, a shock absorber, or a spring.

12. The UAV of claim 1, wherein the at least one second support member is arranged to be under forces between the first frame portion and the third frame portion.

13. The UAV of claim 1, wherein the at least one first support member is arranged to be separate from the second frame portion such that vibrations of the second frame portion are isolated from the at least one first support member.

14. The UAV of claim 1, wherein the first frame portion comprises a tray configured to carry a battery.

15. The UAV of claim 1, wherein:
   at least one of the first frame portion, the second frame portion, or the third frame portion is composed of a first material corresponding to a main frame structure and a second material corresponding to a sub-frame structure; and the second material is more rigid than the first material.

16. The UAV of claim 15, wherein:
the main frame structure has at least one passage; and
the sub-frame structure is arranged in the at least one passage.

17. The UAV of claim 15, wherein the first material is at least one of plastic or ceramic.

18. The UAV of claim 15, wherein the second material is at least one of carbon fiber, steel, or metal.

19. The UAV of claim 1, wherein the vibration of the second frame portion is isolated from the first frame portion by elastically coupling the second frame portion to the first frame portion.

20. The UAV of claim 1, wherein the first frame portion is inelastically secured to the third frame portion.

21. The UAV of claim 1, wherein the at least one hole comprises a cross section larger than a cross section of the first support member such that the first support member is not in contact with the second frame portion.

22. The UAV of claim 1, wherein the first frame portion has one or more apertures to minimize weight.

23. A method for providing an Unmanned Aerial Vehicle (UAV), comprising:
providing a first frame portion, a second frame portion, and a third frame portion, each separated from one another, wherein the second frame portion defines at least one hole;
providing at least one first support member coupled between the first frame portion and the third frame portion;
arranging the at least one first support member to extend from the first frame portion and through the at least one hole to couple to the third frame portion, and
providing at least one second support member coupled between the second frame portion and one or more of the first frame portion or the third frame portion to isolate the first frame portion and the third frame portion from vibration of the second frame portion;
wherein the second frame portion defines at least one hole, and the at least one first support member is arranged to extend from the first frame portion and through the at least one hole to couple to the third frame portion.

24. An Unmanned Aerial Vehicle (UAV), comprising:
a first frame portion, a second frame portion, and a third frame portion, each separated from one another, wherein the second frame portion defines at least one hole;
at least a battery arranged on the first frame portion; and
at least one of a camera, a sensor, a radio-frequency (RF) resource, a processor, or a memory arranged on the third frame portion, wherein:
the first frame portion, the third frame portion, the battery, and the at least one of the camera, the sensor, the radio-frequency (RF) resource, the processor, or the memory are secured together by at least one first support member arranged to extend from the first frame portion and through the at least one hole to couple to the third frame portion.

25. The UAV of claim 24, further comprising at least one aerial propulsion device mounted to the second frame portion, wherein vibration of the at least one aerial propulsion device is isolated from the first frame portion by elastically coupling the second frame portion to the first frame portion.

26. The UAV of claim 24, wherein the at least one hole comprises a cross section larger than a cross section of the first support member such that the first support member is not in contact with the second frame portion.

* * * * *